US009629761B2

(12) United States Patent
Hacikadiroglu et al.

(10) Patent No.: US 9,629,761 B2
(45) Date of Patent: Apr. 25, 2017

(54) TRANSPORT DEVICE

(71) Applicant: MATIA ROBOTICS MEKATRONIK SISTEMLER AR-GE MÜHENDISLIK YAZILIM SANAYI VE TICARET ANONIM SIRKETI, Dudullu, Istanbul (TR)

(72) Inventors: Necati Hacikadiroglu, Istanbul (TR); Enes Canidemir, Istanbul (TR)

(73) Assignee: MATIA ROBOTICS MEKATRONIK SISTEMLER AR-GE MUHENDISLIK YAZILIM SANAYI VE TICARET ANONIM SIRKETI, Istanbul (TR)

( * ) Notice: Subject to any disclaimer, the term of this patent is extended or adjusted under 35 U.S.C. 154(b) by 146 days.

(21) Appl. No.: 14/361,010

(22) PCT Filed: Nov. 20, 2012

(86) PCT No.: PCT/EP2012/073100
§ 371 (c)(1),
(2) Date: May 28, 2014

(87) PCT Pub. No.: WO2013/079359
PCT Pub. Date: Jun. 6, 2013

(65) Prior Publication Data
US 2014/0326521 A1    Nov. 6, 2014

(30) Foreign Application Priority Data
Nov. 28, 2011   (DE) .................. 10 2011 087 253

(51) Int. Cl.
*B62D 57/00*      (2006.01)
*A61G 5/06*       (2006.01)
(Continued)

(52) U.S. Cl.
CPC ............. *A61G 5/061* (2013.01); *A61G 5/068* (2013.01); *A61G 5/14* (2013.01); *A61G 7/1017* (2013.01);
(Continued)

(58) Field of Classification Search
CPC ...... B62D 61/10; B62D 61/12; B62D 61/125; B62D 57/028; B62D 57/024;
(Continued)

(56) References Cited

U.S. PATENT DOCUMENTS 3,150,733 A * 9/1964 Goebel .................. E02F 9/04
                                                180/8.1
3,612,201 A * 10/1971 Smith .................. E02B 17/022
                                                180/8.6

(Continued)

FOREIGN PATENT DOCUMENTS

DE    195 39 238         4/1997
FR    2553368 A1 *       4/1985 ............. B62D 57/00
(Continued)

OTHER PUBLICATIONS

Japanese Office Action dated Jun. 9, 2015 for JP Application No. 2014-542800.

*Primary Examiner* — Joseph Rocca
*Assistant Examiner* — Daniel Yeagley
(74) *Attorney, Agent, or Firm* — Nixon & Vanderhye P.C.

(57) ABSTRACT

A transport device includes a load carrying body, at least one central walking element, a first side walking element and a second side walking element, wherein the at least one central walking element is arranged in-between the two side walking elements. The walking elements are arranged at the load carrying body in a manner to be capable of moving up and down with respect to the load carrying body. The walking elements are arranged at the load carrying body in a manner (Continued)

to be capable of moving back and forth in horizontal direction with respect to the load carrying body, wherein the two side walking elements can move back and forth independently from the at least one central walking element via horizontal actuators.

8 Claims, 31 Drawing Sheets

(51) Int. Cl.

| | |
|---|---|
| *B62D 57/024* | (2006.01) |
| *B62D 57/032* | (2006.01) |
| *A61G 7/10* | (2006.01) |
| *A61G 5/14* | (2006.01) |
| *B62D 51/02* | (2006.01) |
| *B62D 57/028* | (2006.01) |

(52) U.S. Cl.
CPC ........... *B62D 51/02* (2013.01); *B62D 57/024* (2013.01); *B62D 57/028* (2013.01); *B62D 57/032* (2013.01); *A61G 7/1019* (2013.01); *A61G 7/1086* (2013.01); *A61G 7/1094* (2013.01); *A61G 2200/34* (2013.01); *A61G 2200/36* (2013.01)

(58) Field of Classification Search
CPC ....... B62D 57/032; B62B 5/02; B62B 5/0033; B62B 9/02; A61G 5/06; A61G 5/104
See application file for complete search history.

(56) References Cited

U.S. PATENT DOCUMENTS

| | | | | |
|---|---|---|---|---|
| 3,638,747 A * | 2/1972 | Althoff | .................... | B65G 7/02 180/8.5 |
| 3,734,220 A * | 5/1973 | Smith | .................... | E02B 17/022 180/8.6 |
| 4,321,976 A * | 3/1982 | Reinke | .................... | B62D 57/00 180/8.5 |
| 4,674,949 A * | 6/1987 | Kroczynski | ................ | B25J 5/00 114/222 |
| 4,790,400 A * | 12/1988 | Sheeter | ...................... | E02F 9/04 180/8.1 |
| 5,351,773 A * | 10/1994 | Yanagisawa | ......... | B62D 57/032 180/8.3 |
| 5,429,009 A * | 7/1995 | Wolfe | .................... | B62D 57/032 180/8.5 |
| 5,857,533 A * | 1/1999 | Clewett | .................... | B62D 57/00 180/8.1 |
| 6,068,073 A * | 5/2000 | Roston | ................. | B62D 57/028 180/8.3 |
| 6,267,191 B1 * | 7/2001 | Hettinger | ............. | B62D 57/032 180/187 |
| 6,695,084 B2 * | 2/2004 | Wilk | ...................... | A61G 5/068 180/117 |
| 2003/0127259 A1 * | 7/2003 | Logstrup | ................... | B62B 5/02 180/23 |
| 2003/0208303 A1 * | 11/2003 | Okamoto | ................... | B25J 9/06 700/245 |
| 2006/0151218 A1 * | 7/2006 | Goren | .................... | A61G 5/061 180/24.02 |
| 2006/0214622 A1 * | 9/2006 | Summer | .............. | B62D 57/032 318/568.12 |
| 2008/0150465 A1 * | 6/2008 | Baba | ................... | B62D 57/032 318/568.12 |
| 2011/0175302 A1 | 7/2011 | Sherman et al. | | |
| 2011/0190933 A1 | 8/2011 | Shein et al. | | |
| 2011/0231050 A1 * | 9/2011 | Goulding | ............ | B62D 57/024 701/26 |
| 2012/0175172 A1 * | 7/2012 | Bouhraoua | .......... | B62D 61/125 180/8.2 |

FOREIGN PATENT DOCUMENTS

| | | | | |
|---|---|---|---|---|
| GB | 2201926 A * | 9/1988 | ............. | A61G 5/061 |
| JP | 1999-059515 | 3/1999 | | |
| JP | 2001-010561 | 1/2001 | | |
| TR | WO 2009078825 A2 * | 6/2009 | ............ | B25J 19/002 |

* cited by examiner

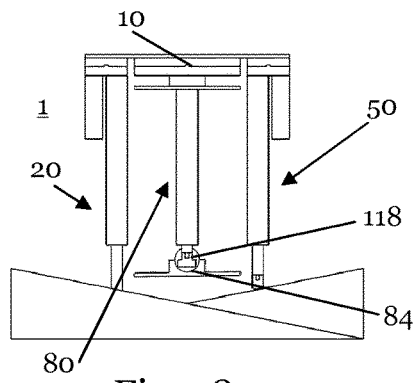 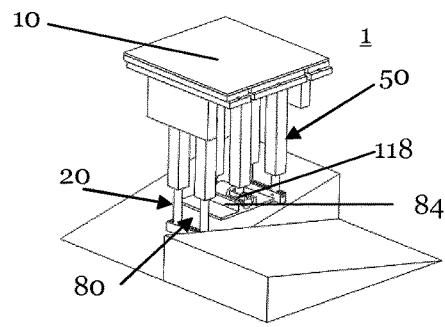
Fig. 38a  Fig. 38b
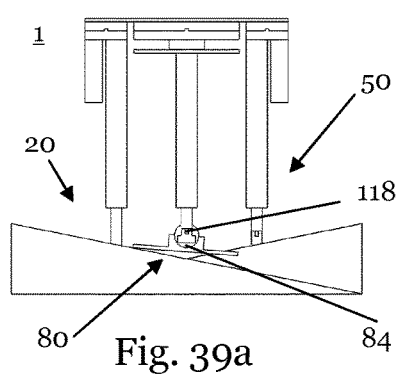 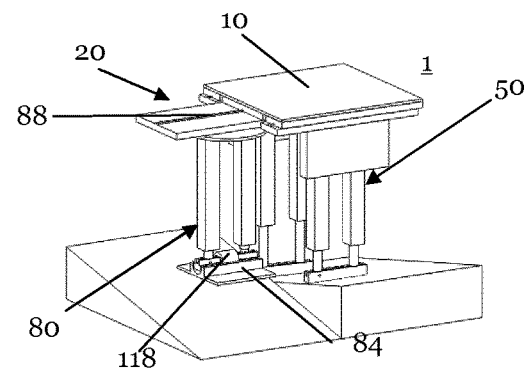
Fig. 39a  Fig. 39b
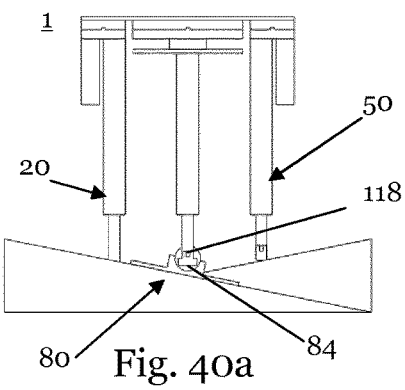 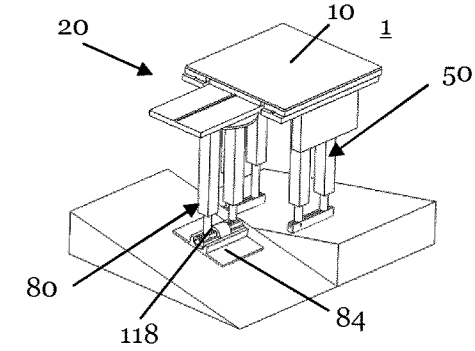
Fig. 40a  Fig. 40b
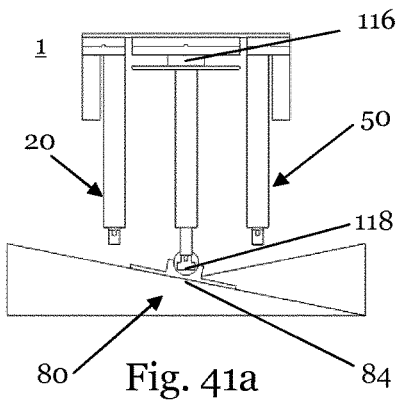 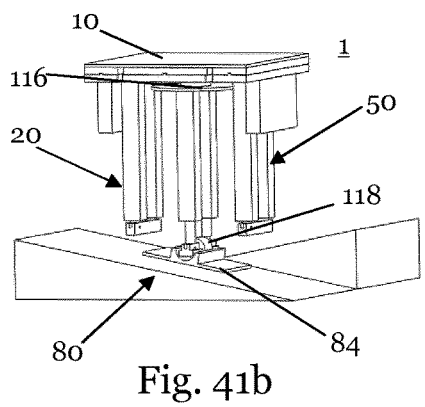
Fig. 41a  Fig. 41b

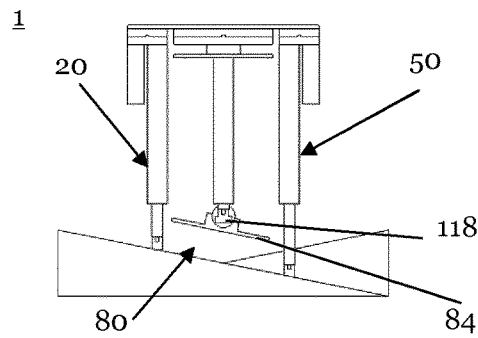
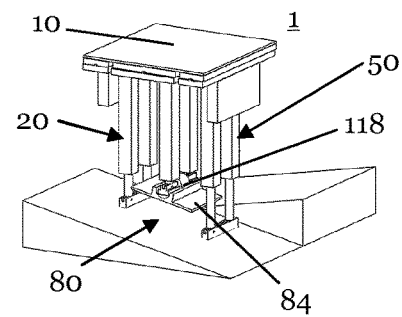
Fig. 42a  Fig. 42b
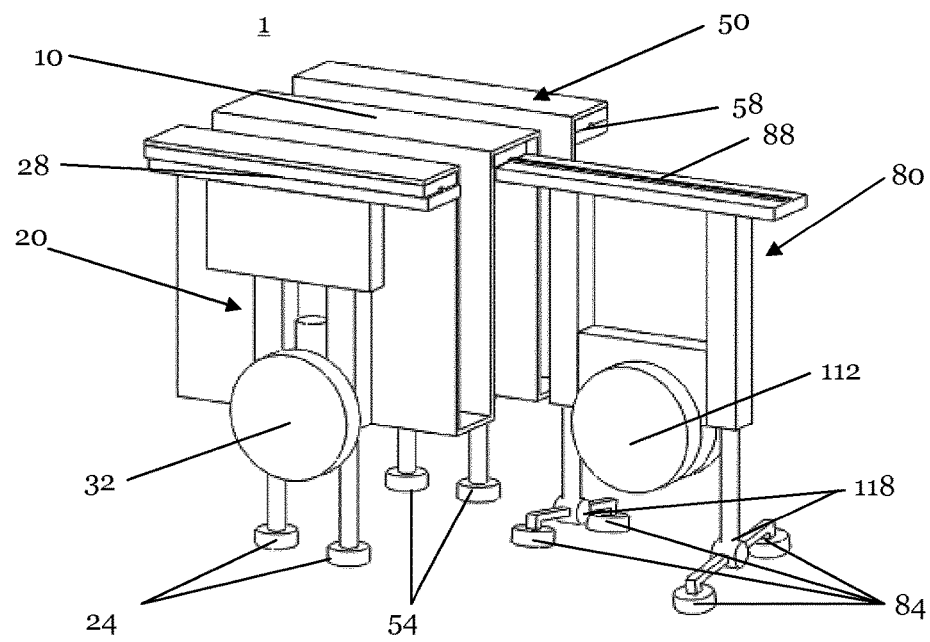
Fig. 43

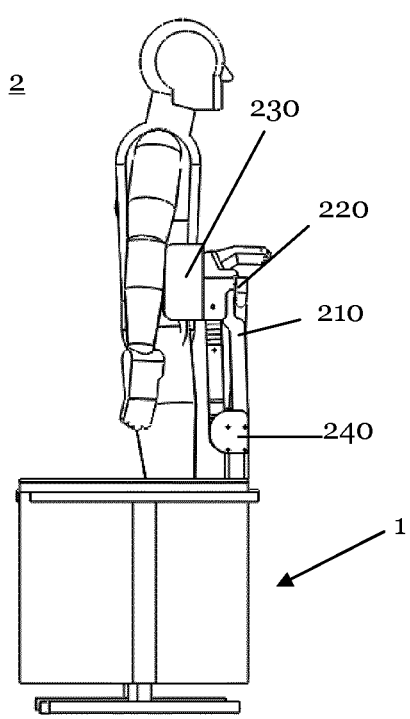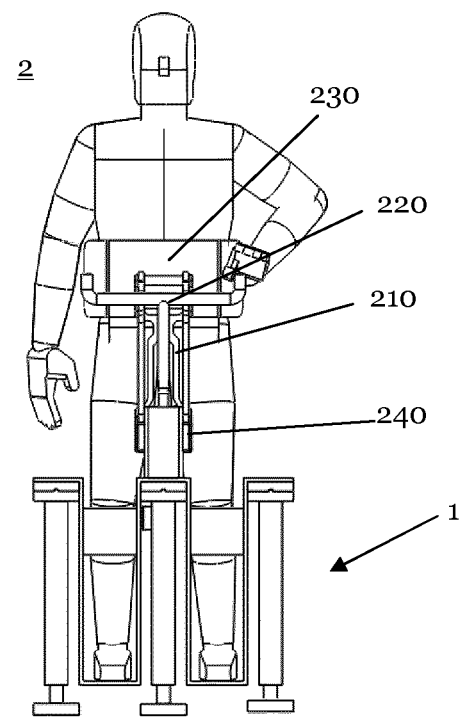
Fig. 46
Fig. 47

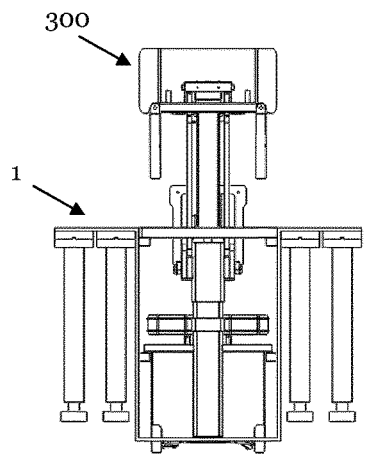
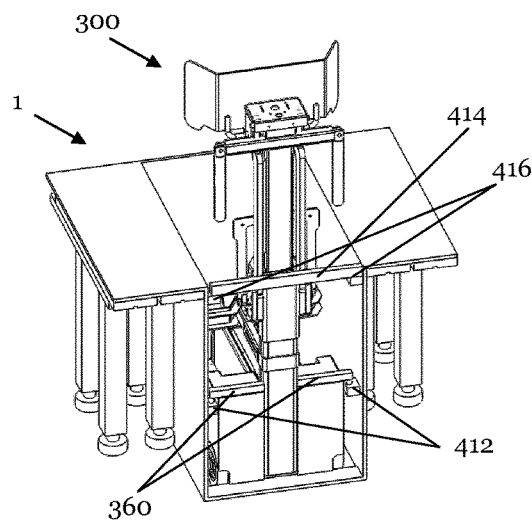
Fig. 51a
Fig. 51b
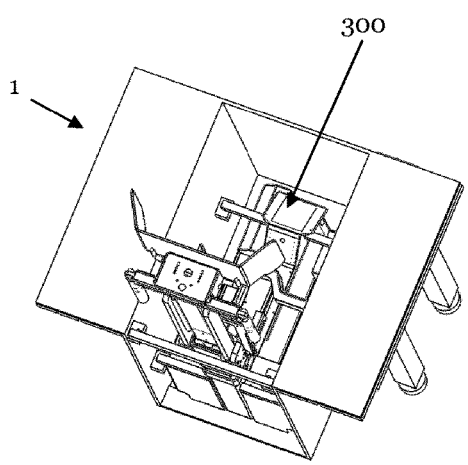
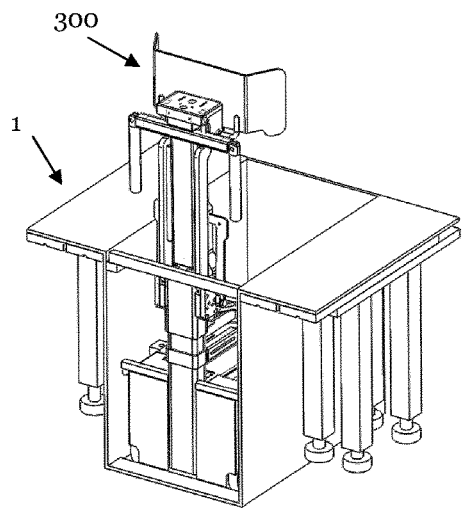
Fig. 51c
Fig. 51d

TRANSPORT DEVICE

This application is the U.S. national phase of International Application No. PCT/EP2012/073100 filed 20 Nov. 2012 which designated the U.S. and claims priority to DE Patent Application No. 102011087253.1 filed 28 Nov. 2011, the entire contents of each of which are hereby incorporated by reference.

1. FIELD OF THE INVENTION

The present invention relates to a transport device that is able to pass over obstacles. In particular, a transport device according to the invention enables physically disabled people to move around and to pass over obstacles, particularly stairs.

2. PRIOR ART

Transport devices that are able to pass over obstacles are known in the prior art in various embodiments. They can for example be driven by wheels or caterpillar-like. Other transport devices are provided with legs and can move around in a walking fashion.

Mobility devices for disabled people are nowadays provided in the kind of manually or electrically driven wheelchairs with wheels. By means of such mobility devices the mobility of physically disabled people has heavily improved in daily life. However, electric or manual wheelchairs have the disadvantage of lacking abilities to pass over obstacles, such that some places within or outside a building are hardly or not at all accessible. Most important in daily life of physically disabled people is the ability to climb stairs.

In newer developments such mobility devices are provided with further devices to pass over obstacles. However such devices are usually very complex in its mechanics.

The WO 2009/051574 A1 discloses a bipedal or multi legged robotic orthosis and exoskeleton system. The system uses the walking principle of humans.

The U.S. Pat. No. 5,653,301 discloses a wheel-supported apparatus that is used for climbing and descending stairs. By means of such an apparatus, physically disabled people can climb stairs without help of an attendant. This apparatus uses a first carriage unit located in the main frame of the apparatus and is slidably connected thereto. A second carriage unit is slidably interconnected to the first carriage unit and is provided with a lower ground engaging portion. Additionally the device uses first and second extendable legs, for climbing stairs. Since the device additionally uses its wheels to step on the stairs the stability of the device during climbing stairs is decreased. Further this approach requires to use small wheels that have weak rolling properties on even ground.

The WO 01/53137 A1 discloses another transport arrangement for movement on uneven surfaces. The transport arrangement comprises at least three actuator legs at both sides of the vehicle, having driven wheels at the lower end. For climbing stairs the wheels step on the stairs and move forward by drive motors that drive the wheel. Again, this requires that the wheels have a small diameter, such that they have weak rolling properties on even ground. Further this solution has a lack of stability because of the rolling contact of the wheels to the steps.

Based on the above mentioned prior art, it is a problem of the present invention to provide a transport device that is able to pass over obstacles and has an improved stability, is less complex in construction, requires less space, is universally usable and particularly allows to be used as mobility device for physically disabled people.

3. SUMMARY OF THE INVENTION

The above mentioned problem is solved by a transport device according claim 1, by a method for controlling the transport device according claim 14 as well as by a transport device for physical disabled people according to claim 16.

Particularly, the above mentioned problem is solved by a transport device comprising a load carrying body, at least one central walking element, a first side walking element and a second side walking element, wherein the at least one central walking element is arranged in-between the two side walking elements and the walking elements are arranged at the body in a manner to be capable of moving up and down with respect to the body, wherein the side walking elements can move up and down independently from the central walking element by means of vertical actuators and the walking elements are arranged at the body in a manner to be capable of moving back and forth in horizontal direction with respect to the body, wherein the walking elements can move back and forth independently from the central walking element by means of horizontal actuators.

The transport device is capable of being used for transporting any kinds of goods as well as physically disabled people. The transport device comprises a load carrying body that can be very flexibly adapted to the desired use-case, for example by attaching a transport box, a seat, a device for supporting standing people or the like. Particularly the transport device can also be used as a deck for an indoor device for physically impaired people that preferably has electrically driven wheels. Such an indoor device can be connected to and is separable from the transport device.

The basic principle of the invention lies on the one hand in the fact that by providing walking elements that can move up and down and back and forth with respect to the load carrying body it is on the one hand possible to perform walking motions of the transport device that allow to pass over obstacles. Further, due to this arrangement it possible to move the load carrying body back and forth in horizontal direction with respect to the floor in order to move the center of mass over the walking element actually contacting the ground. Thus, the load carrying body and the loaded objects and/or person can be moved independently from the walking elements in order to move the projection of the center of mass to the floor, over or in-between the walking elements contacting the ground in this point of time. Therefore, the transport device always remains stably balanced and can walk safely over obstacles for example stairs.

Walking elements, which at a point in time are not loaded can be moved back and forth and up and down independently from the other elements of the transport device. By this arrangement it is possible to adopt the transport device on the one hand to different allocations of loads and on the other hand to the present shape of the ground over which the transport device is moving. Thereby, of course it can be ensured that the balance of the entire system is maintained.

Preferably all walking elements can move up and down and/or back and forth independently from each other. Therefore, the transport device is able to vary the climbing method in order to react on specific circumstances. For example it is possible the pass over different types of stair steps, ridges or the like. That is favorable in view of varying load distributions, particularly when carrying people.

Preferably the side walking elements comprise ground touching portions with an extension in lateral direction, such that the transport device is capable of standing stably alone on the side walking elements and the at least one central walking element comprises a ground touching portion in lateral direction and in transversal direction such that the transport device is capable of standing stably alone on the central walking element. Thereby, the transport device is stable in any phase of the movement, even if it stands only on the central walking element or only on the side walking elements.

Preferably the transport device comprises a controller to control the movements of the walking elements and the load carrying body with respect to each other in a manner that the projection of the center of mass of the transport device and a load to the floor is always under or in between the loaded walking element(s). If the projection of the center of mass of the transport device and a load to the floor is always under or in between the loaded walking element(s) then the transport device is in a stable condition, i.e. does not tilt or falls in one direction. The controller controls the movements of the walking elements and the load carrying body and thereby enables the system to remain stable in every phase of the movement. To do so, the controller may cooperate with force sensors, distance sensors, optical sensors, cameras, tilting sensors or other suitable sensors that signalize to the controller the present condition of the ground and the present force distribution of the transport device including the load. Such force sensors and/or distance sensors are preferably integrated into the walking elements.

In a preferred embodiment the transport device further comprises wheels, wherein the transport device is able to either walk by means of the walking elements, or can drive by means of the wheels. Thereby, the movement principle can be chosen according the ground surface. If an even surface is given the transport device can drive on its wheels, which is much faster than walking on the walking elements. On the other hand if the surface is uneven or has obstacles such as stairs the transport device can use its walking elements to overcome such obstacles what would not possible by means of the wheels.

Preferably the walking element comprises a ground touching portion in the form of a rectangular plate for every walking element, wherein the central walking element preferably has other dimensions than the side walking elements, and/or is in form of at least one wheel and/or in the form of at least one round plate. The ground touching portions of the walking elements may comprise different forms, shapes and/or sizes. Especially for embodiments with plate-shaped ground touching portions it is preferred, that the central walking element comprises a ground touching portion with larger dimensions than the ones of the two side walking elements, in order to stand stably on the central walking element alone.

Preferably in case the transport device comprises wheels, they can be combined with a rectangular plate and a round plate. Then, the wheels provide an alternative movement method, when the transport device is moving on plane ground, whereas the plates are used to pass over obstacles.

Preferably the transport device comprises wheels, which can be supported by the load carrying body, via outer side panels and/or supported by the plate-shaped ground touching portion and/or supported by the shafts of the walking elements and/or an indoor device connected to and separable from the load carrying body. There are several ways of mounting wheels to the transport device, such that it can be switched from walking on the plates or driving on the wheels. By choosing one constructive alternative, the transport device can be adapted to the specific requirements of the user. In the easiest way the wheels are supported to the load carrying body, such that the switching between walking and driving is simply done by retracting the walking elements.

If the wheels are mounted on the plate-shaped ground touching portions they are preferably able to moved up and down by separate actuators. Therefore, it is for example possible to drive ramps upwards and downwards, while the load carrying body remains horizontal due to an adapted extension of the walking elements.

Preferably the transport device comprises more than one central walking element, preferably two central walking elements, wherein the more than one central walking elements are arranged adjacent to the two side walking elements and spaced apart from each other. The invention is not restricted to embodiments with only one central walking element. It is also possible to provide more than one central walking element, in order to be more flexible in the way how the load carrying body is formed and how the load is carried. This allows for adapting the transport device to the specific use-cases.

Preferably the load carrying body comprises raised actuator support portions and one or more lowered portions. Especially for embodiments, which are designed for carrying goods or people it is favorable to attach the load to the load carrying body as low as possible to the ground. For such an application it might be favorable to have two side and one central walking elements and two lowered portions of the load carrying body between the central and one side walking element onto which the person can put his feet.

Preferably the central walking element comprises a rotatory actuator for a rotation of the central walking element with respect to the load carrying body around a vertical axis. By use of such a rotatory actuator it is possible to change the walking or driving direction of the transport device during the transport. The central rotatory element can preferably be located between the load carrying body and the central horizontal actuator or between the vertical actuator and the shaft of the central walking element.

Preferably the walking elements comprise more than one vertical actuator per walking element, wherein the vertical actuators are arranged one after the other in direction of the back and forth movement. The invention is not limited to embodiments with only one vertical actuator per walking element. For instance it might be desirable to use two actuators with less power than one huge powerful one. This further allows that the transport device can walk over slopes and keep the load carrying body horizontal.

Preferably the more than one actuators per walking element comprise either one common ground touching portion per walking element to which the more than one vertical actuators are pivotably fixed or each of the more than one vertical actuators comprises its own ground touching portion. This allows for compensating uneven grounds, especially ones that are sloped in movement direction. The two or more actuators can adjust the ground touching portions to be parallel to the ground, while maintaining the load carrying body horizontal. Therefore, the transport device can for example stand stably alone on the central walking element, even if the ground is sloped. The compensation of slopes is done by adjusting the height of every actuator in a way that the load carrying body remains horizontal or is arranged in any desired orientation.

Preferably, if one ground touching portion fixed to more than one vertical actuator, the connection of the ground touching portions to the vertical actuators is done by hinges, which allow a rotary movement around the pitch axes of the hinge. In the other alternative each actuator comprises its own small spot-shaped ground touching portion.

Preferably the central walking element comprises a lockable hinge between the actuator and the ground touching portion, wherein the lockable hinge having a rotating axis in the direction of the back and forth movement. When the transport device stands only on the two side walking elements, slopes in the direction orthogonal to the back-and-forth-direction can be compensated by adjusting different heights of the two side walking elements. In order to compensate this gradient also, when the transport device stands solely on the central walking element, the transport devices comprises a lockable hinge between the actuator and the ground touching portion having a rotating axis in the direction of the back and forth movement. Preferably, this hinge is unlocked, i.e. can rotate, when the central walking element is moved down to the floor. When the ground touching portion of the central walking element touches the ground completely, and thereby adopts the orientation of the ground, the hinge is locked. In this way the transport device cannot tilt aside and the load carrying body is kept in the desired angle, even if the transport device stands only on the central walking element.

The above mentioned problem is also solved by a method for controlling a transport device as described above to pass over obstacles, comprising the steps of
   (a) moving at least one walking element horizontally in order to move it forward and/or backward;
   (b) moving the at least one walking element up and/or down to move it over an obstacle; and
   (c) moving the load carrying body independent from the walking element(s) horizontally in order to maintain the projection of the center of mass to the floor of the transport device and a load under or in-between the loaded walking element(s).

By maintaining the projection of the center of mass to the floor of the transport device and a load under or in-between the loaded walking element(s), it is guaranteed that the entire transport device including the load, is always in a stable condition. By varying the position of the load carrying body independently from the walking elements the transport device ensures the balance around an axis in the horizontal plane perpendicular to the movement axis.

Preferably, the transport device touches in every phase of the passing over of the obstacle not more than two height-levels. In one alternative the way of walking of the transport device comprises two different phases. In the first phase, the transport device stands on the two side walking elements, then the at least one central element is moved to a different position and in the second phase, the transport device stands on the central leg. Subsequently, the load carrying body is moved such that the projection of the center of mass the ground lies under the central leg. Thus, especially in the view of climbing stairs, the transport device needs to stand on two different stair steps, only.

In another preferred embodiment the transport device touches in one or more phases of the passing over the obstacle more than two height-levels. In this alternative method of walking the side walking elements can be on different height levels such that they are touching different steps of stairs for example. This improves the stability of transport device.

The above mentioned problem is also solved by a transport device for physically disabled people comprising a transport device as described above and a human elevation and fixation structure comprising a pivot arm, pivotably connected to the load carrying body, a support structure, and a torso support at the upper end of the pivot arm. The above mentioned embodiments of the transport device can be used to enable physically disabled people to move around and thereby to pass over obstacles. To this end the transport device further comprises a human elevation and fixation structure.

The human-elevation-and-fixation-structure is fixed to the transport device. Having such an arrangement, no other technical assisting systems are necessary for a physically disabled person—like separate lifting structures—in order to move from a sitting or lying position to a position standing on the transport device.

The transport device allows that a sitting physically disabled person is fixed by the torso support to the hinged-down pivot arm of the transport device in order to be raised up by the pivot arm into a standing position, wherein the person stands on the transport device.

For the fixing of the torso support to the body of the person by one or more belts the possibility to raise or lower the load carrying body by means of the walking elements is used. Thereby, the fixing of the belts to the person is facilitated since the legs of the person can be raised by the load carrying body.

Preferably, all elements of the transport device during use by a seated person that extend above waist height can be lowered to this height or below. This enables perfect sight for the person and the use of common tables or other furniture by a person being attached to the transport device.

Preferably, the transport device serves as a deck for and comprises an indoor-device for physically disabled people, wherein the indoor-device is connected to and separable from the load carrying body and comprises at least one motor and wheels for maneuvering the indoor-device and the transport device, and a pivot arm, wherein the indoor device enables physically disabled people to move around in a standing or sitting position. The transport devices can carry a mobility device for physically disabled people that is mainly used indoors. By connecting the indoor device to the transport device the same mobility device can be used outdoors as well since the transport device can easily climb over obstacles or even can climb stairs. Thereby a modular mobility device for physically impaired people is provided.

Further preferred embodiments result from the sub-claims.

4. SHORT DESCRIPTION OF THE DRAWINGS

In the following preferred embodiments of the invention are described with respect to the drawings in which shows:

FIG. 1 a three-dimensional view of a first embodiment of the transport device, showing the minimum configuration;

FIG. 2 a three-dimensional side view of the first embodiment of the transport device, showing the transport device standing in a raised position solely on the central ground touching portion with—in lateral direction—extended side walking elements;

FIG. 3 a three-dimensional view of the first embodiment of the transport device, showing the transport device standing in a raised position on all three ground touching portions with in lateral direction maximum extended walking elements;

FIGS. 4a-4h a preferred method of stair climbing by the first embodiment of the transport device in a chronological sequence of pictures;

FIG. 5 a three-dimensional side view of a second embodiment of the transport device, showing the transport device with—compared to the first embodiment—longer vertical actuators and shafts, wherein the transport device executes another method of stair climbing;

FIG. 6 a three-dimensional side view of the second embodiment of the transport device, showing the transport device in another phase of the alternative method of stair climbing;

FIG. 7 a three-dimensional view of a third embodiment of the transport device, showing two lowered portions of the load carrying body in-between the actuator support portions;

FIG. 8 a three-dimensional front view of the third embodiment of the transport device;

FIG. 9 a three-dimensional view of a fourth embodiment of the transport device, showing two separate central walking elements and one central lowered portion of the load carrying body in-between these two central walking elements;

FIG. 10 a three-dimensional view of the fourth embodiment of the transport device, showing the transport device in a raised position standing on one central walking element and on one side walking element with partially displaced walking elements;

FIG. 11 a schematic front view of a fifth embodiment of the transport device, showing wheels that are attached to side portions which are fixed to the load carrying body;

FIG. 12 a three-dimensional view of the fifth embodiment of the transport device;

FIG. 13 a three-dimensional view of the fifth embodiment of the transport device, showing the transport device in a raised position standing on the two side walking elements;

FIG. 14 a schematic front view of a sixth embodiment of the transport device, showing wheels, that are fixed to the shafts of the walking elements;

FIG. 15 a three-dimensional view of the sixth embodiment of the transport device, showing the transport device with—in lateral direction—maximum extended walking elements;

FIG. 16 a three-dimensional view of the sixth embodiment of the transport device, showing the transport device standing in a raised position on all three ground touching portions with in lateral direction extended walking elements;

FIG. 17 a three-dimensional front view of a seventh embodiment of the transport device, showing wheels, that are fixed to vertical wheel suspension actuators, which are fixed to the ground touching portions of the walking elements;

FIG. 18 a three-dimensional front view of the seventh embodiment of the transport device, showing the transport device standing in a raised position on all three ground touching portions with in lateral direction extended walking elements;

FIG. 19 a three-dimensional side view of the seventh embodiment of the transport device, showing the transport device standing on the wheels of the transport device;

FIG. 20 a three-dimensional side view of the seventh embodiment of the transport device, showing the transport device rolling upwards a ramp, wherein the vertical actuators of the walking elements are driven in a way, that the load carrying body stays horizontally;

FIG. 21 a schematic side view of the seventh embodiment of the transport device, showing the transport device in the position similar to FIG. 20;

FIG. 22 a schematic side view of an eighth embodiment of the transport device, showing the transport device with two vertical actuators per walking element;

FIG. 23 a three-dimensional side view of the eighth embodiment of the transport device, showing the transport device in the position of FIG. 22;

FIG. 24 a schematic side view of the eighth embodiment of the transport device, showing the transport device leaning backwards by driving the vertical actuators of the transport device in a way so that the front vertical actuators are extended more than the back ones;

FIG. 25 a schematic side view of the eighth embodiment of the transport device, showing the transport device leaning forwards by driving the vertical actuators of the transport device in a way so that the front vertical actuators are extended less than the back ones;

FIG. 26 a three-dimensional view of a ninth embodiment of the transport device, showing the transport device being tilted backwards and comprising a rotatory actuator between the horizontal actuator and a shaft of the central walking element;

FIG. 27 a schematic side view of the ninth embodiment of the transport device, showing the transport device in the phase of adapting the orientation of the central ground touching portion to the orientation of the ground;

FIG. 28 a schematic side view of the ninth embodiment of the transport device, showing the transport device standing on an adapted ground touching portion of the central walking element which is adapted to the orientation of the ground.

FIG. 29 a three-dimensional view of the ninth embodiment of the transport device similar to the position in FIG. 28;

FIG. 30 a schematic side view of the ninth embodiment of the transport device, showing the transport device standing on the central ground touching portion, wherein the transport device is rotated by the use of the rotatory actuator of the central ground touching portion;

FIG. 31 a three-dimensional view of the ninth embodiment of the transport device, wherein the transport device is standing in a raised position solely on the central walking element;

FIG. 32 a three-dimensional view of the ninth embodiment of the transport device of FIG. 31, wherein the transport device executes a rotation by the use of the rotatory actuator;

FIG. 33 a three-dimensional view of the ninth embodiment of the transport device of FIG. 31, wherein the transport device has executed a 90°-rotation by the use of the rotatory actuator;

FIG. 34 a three-dimensional view of a tenth embodiment of the transport device, wherein the central walking element comprises two sets of vertical actuators and ground touching portions, wherein the corresponding wheels are arranged in-between the ground touching portions;

FIG. 35 a three-dimensional view of a eleventh embodiment of the transport device, showing the transport device with base enlargement portions attached to the side walking elements;

FIG. 36 a three-dimensional view of a twelfth embodiment of the transport device, showing the transport device with separate ground touching portions for each vertical actuator;

FIG. 37 a three-dimensional view of the twelfth embodiment of the transport device, showing the transport device climbing stairs in a third alternative way of climbing;

FIGS. 38a-42b show a thirteenth embodiment of the transport device in a chronological sequence of pictures that illustrates a walking method over vertically sloped ground, wherein the chronology is determined by the picture number 38, 39, 40, . . . and "a" and "b" of the same number describe the same phase but from differing points of view.

FIG. 43 a three-dimensional view of the fourteenth embodiment of the transport device, showing a combination of wheels, separate and combined ground touching portions, wherein the wheels of the central walking element are arranged in between the vertical actuators;

FIG. 44 a schematic front view of the fourteenth embodiment, wherein the transport device stands on the ground touching portions of the side walking elements;

FIG. 45 a schematic front view of the fourteenth embodiment, wherein the transport device stands on all ground touching portions;

FIG. 46 a schematic side view of a transport device for physically disabled people, wherein the person is standing on the transport device;

FIG. 47 a schematic front view of a transport device for physically disabled people showing a person standing on the transport device similar to FIG. 46;

FIGS. 51a-51d show different perspective views of an indoor-device linked with the transport device;

5. DESCRIPTION OF PREFERRED EMBODIMENTS

In the following preferred embodiments of the invention are described with respect to the accompanying figures. Even if not explicitly mentioned, the features of a certain embodiment can likewise be used in another embodiment if appropriate.

Figure 1:
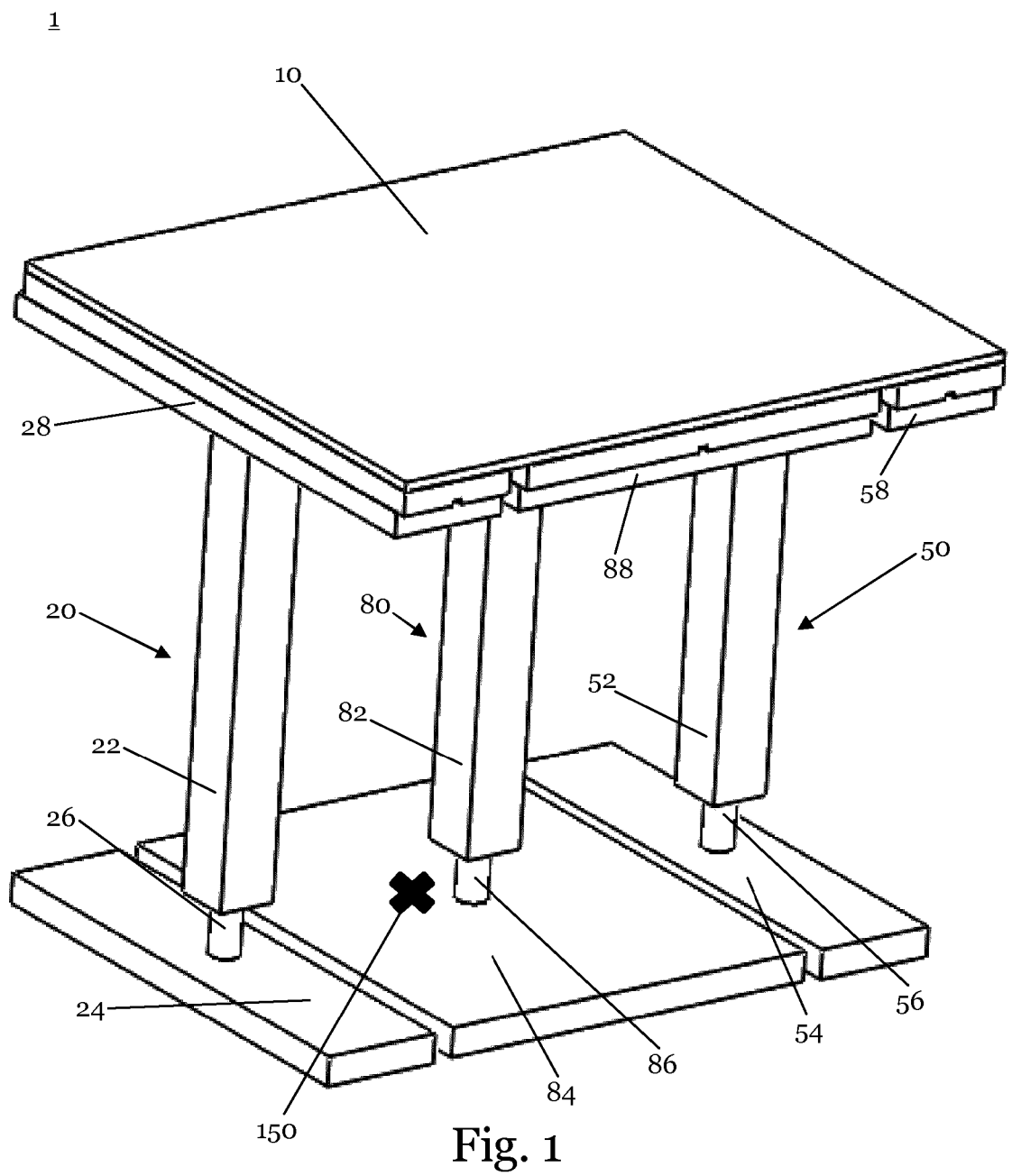

FIG. 1 shows a three-dimensional view of the first embodiment of the transport device 1 showing the minimum configuration of a transport device 1. The transport device 1 comprises a load carrying body 10, a first side walking element 20, a second side walking element 50 and a central walking element 80. A walking element 20, 50, 80 consists of a shaft 22, 52, 82, a vertical actuator 26, 86, 56 and a ground touching portion 24, 54, 84. The walking elements 20, 50, 80 are attached to the load carrying body 10 via vertical actuators 28, 58, 88. The reference number 150 describes the centre of mass that is projected to the ground of the transport device 1 including the load.

The vertical actuators 26, 56, 86 of the walking elements 20, 50, 80 are able to elongate or contract in order to vary the distance between the ground touching portion 24, 54, 84 to the load carrying body 10. In the first embodiment, the first and second side walking elements 20, 50 always act in parallel. That means that every actuation of the horizontal actuators 28, 58 or vertical actuators 26, 56 is done in parallel for the two side walking elements. As explained above, the walking elements are attached to the load carrying body 10 by horizontal actuators 28, 58, 88. These horizontal actuators 28, 58, 88 are able to move the load carrying body 10 back and forth in the direction of walking independently from the position of the walking elements 20, 50, 80. In return, walking elements 20, 50, 80 can be moved horizontally with respect to the load carrying body 10. When one or possibly two walking elements do not touch the ground, it is possible to move these walking elements back and forth in respect to the ground without moving the load carrying body 10.

Figure 2:
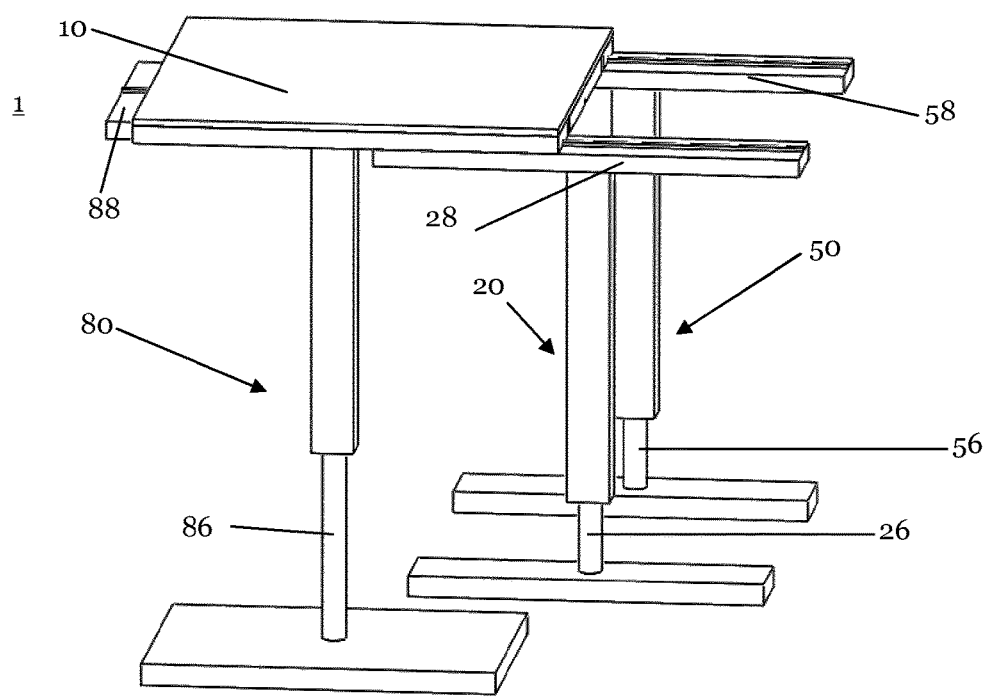

FIG. 2 shows a three-dimensional side view of the first embodiment of the transport device 1, showing the transport device 1 standing in a raised position solely on the central ground touching portion 84. The side walking elements 20, 50 are extended in lateral direction. FIG. 2 shows the way of performing a step movement done by the two side walking elements 20, 50. Therefore, either the vertical actuator 86 is driven to lower the entire transport device 1 including the load or by extending the vertical actuators 26, 56 of the side walking elements 20, 50 in order to lower the ground touching portions 24, 54 of the side walking elements 20, 50. Then in the next phase (not shown in FIG. 2) the load carrying body 10 can be moved forward by actuating the three horizontal actuators 28, 58, 88 in a way that the load carrying body 10 moves with its load from the central walking element 80 above the side walking elements 20, 50 thereby shifting the centre of mass over the side walking elements 20, 50.

Figure 3:
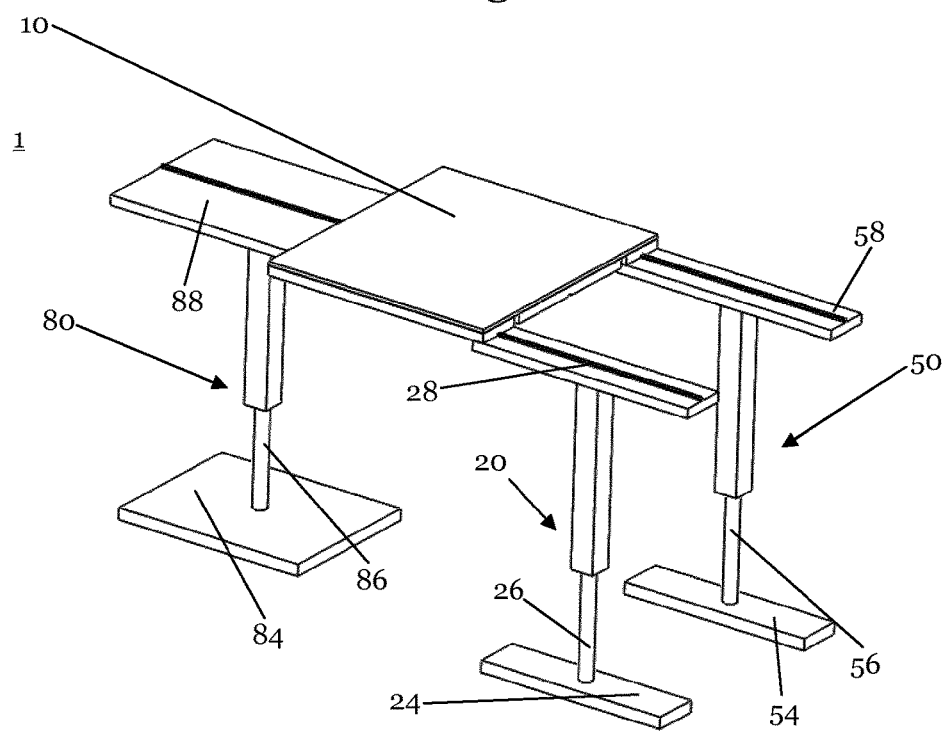

FIG. 3 shows a three-dimensional view of the first embodiment of the transport device, showing the transport device standing in a raised position on all three ground touching portions 24, 54, 84 with—in lateral direction—maximum extended walking elements 20, 50, 80. With reference to FIG. 1 which shows the transport device 1 that is as compact as possible, FIG. 3 shows the other extreme, namely the maximum extension of all actuators 26, 28, 56, 58, 86, 88.

Figure 4A:
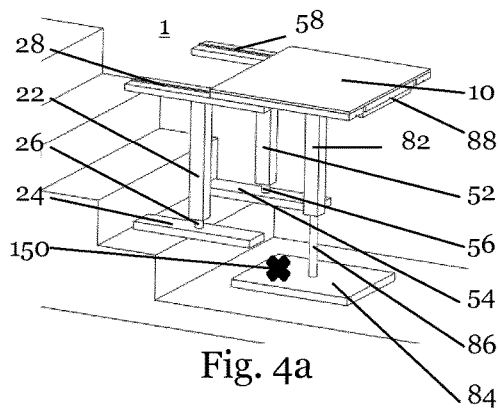

The sequence of FIGS. 4a-4h shows a preferred method of stair climbing by the first embodiment of the transport device 1 in a chronological sequence of pictures. In FIG. 4a, the transport device 1 stands on the central ground touching portion 84 with an extended vertical actuator 86 of the central walking element 80. The load carrying body 10 is located over the ground touching portion 84 of the central walking element 80. Thus, the projected centre of mass 150, projected to the floor, is located below the ground touching portion 84 of the central walking element 80. The two side walking elements 20, 50 are positioned on the first step of stairs wherein the horizontal actuators 28, 58 of the side walking elements 20, 50 are extended in the direction of movement.

Figure 4B:
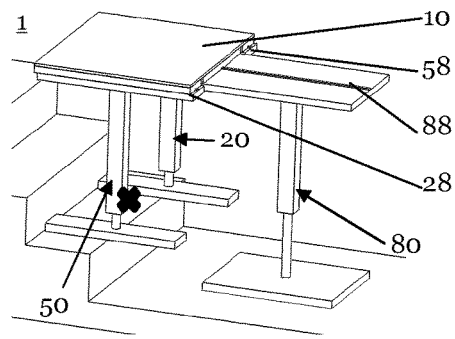

FIG. 4b shows the next phase of the walking method, when the load carrying body 10 has been moved forward over the two side walking elements 20, 50. Thus, the projected centre of mass 150 also moved forward in the direction of movement. It is necessary for moving the load carrying body 10 to drive all horizontal actuators 28, 58, 88 of the walking elements 20, 50, 80 in order to move the load carrying body 10 without moving any of the walking elements 20, 50, 80 with respect to the ground.

Figure 4C:
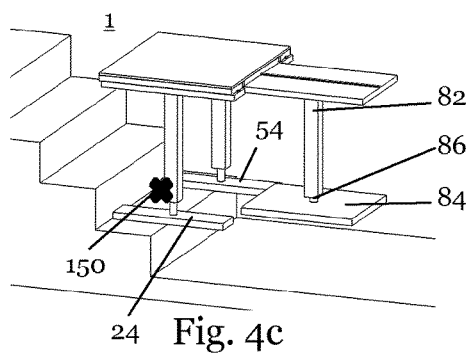

FIG. 4c shows the next phase in which the vertical actuator 86 of the central walking element 80 is driven in a way that the ground touching portion 84 of the central walking element 80 is raised. In this position, the projection of the centre of mass 150 is located stably between the parts of the ground touching portions 24, 54 that touch the corresponding stair step, so that the entire transport device 1 including its load is stable.

Figure 4D:
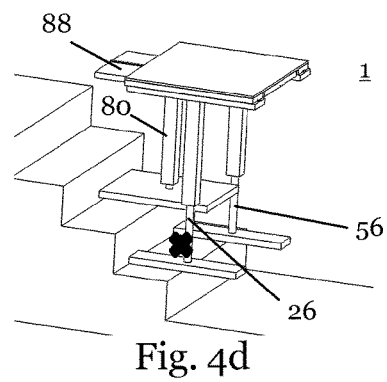

FIG. 4d shows the next phase in the method of stair climbing wherein at first the vertical actuators 26, 56 of the side walking elements 20, 50 are extended in a way that the load carrying body 10 is raised and the central walking element which is fixed to the load carrying body 10 is also pulled upwards. Then, the horizontal actuator 88 of the central walking element 80 is driven in a way that the central walking element 80 moves forward in a direction of walking until it reaches the next step of the stairs.

Figure 4E:
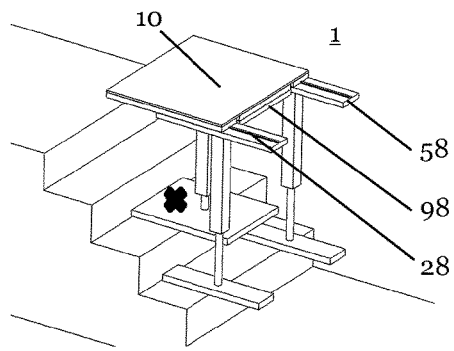

FIG. 4e shows the next phase of the method of stair climbing wherein the load carrying body 10 is driven forward by driving the three actuators 28, 58, 88 of the walking elements 20, 50, 80 in a way that the load carrying body 10 is located over the central walking element 80. This shifts the projection of the centre of mass 150 to the next step in walking direction, such that the side walking elements 20, 50 can be lifted from the corresponding step of the stairs.

Figure 4F:
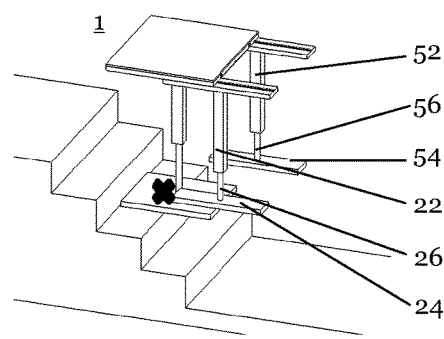

In the next phase, shown in FIG. 4f, the vertical actuator 86 of the central walking element 80 is extended in a way that the load carrying body 10 is raised. Since the side walking elements 20, 50 are fixed via the vertical actuators 28, 58 to the load carrying body, they are also pulled upwards. As explained above, in this phase the projected centre of mass 150 is located in that part of the ground touching portion 84 of the central walking element 80 which touches the stair step. Thus, the entire transport device 1 including its load is stable in that phase.

Then, the two side walking elements 20, 50 are moved forward in the direction of the stair climbing by driving the horizontal actuators 28, 58 until the ground touching portions 24, 54 of the side walking elements 20, 50 reach the next step of the stairs.

Figure 4G:
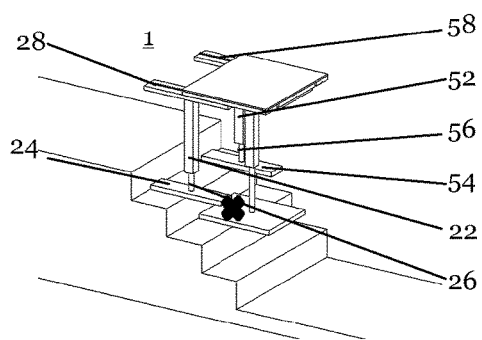

FIG. 4g shows the end position after the side walking elements 20, 50 reach the next step of the stairs. The climbing cycle to climb over two steps of a stairway is completed and the position of the transport device 1 is the same the one in FIG. 4a. One will see that the entire transport device 1 including its load has climbed up two steps of the stairs.

Figure 4H:
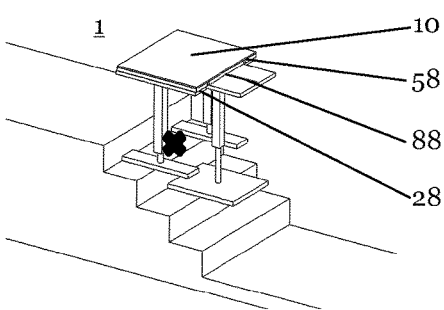

FIG. 4h shows—similar to FIG. 4b—the position, when the load carrying body 10 is driven forwards in the direction of the stair climbing by driving the three horizontal actuators 28, 58, 88 of the walking elements 20, 50, 80. This is necessary to move the load carrying body 10 without moving any of the walking elements 20, 50, 80 in order to shift the centre of mass 150 forwards for the next walking motion.

Figure 5:
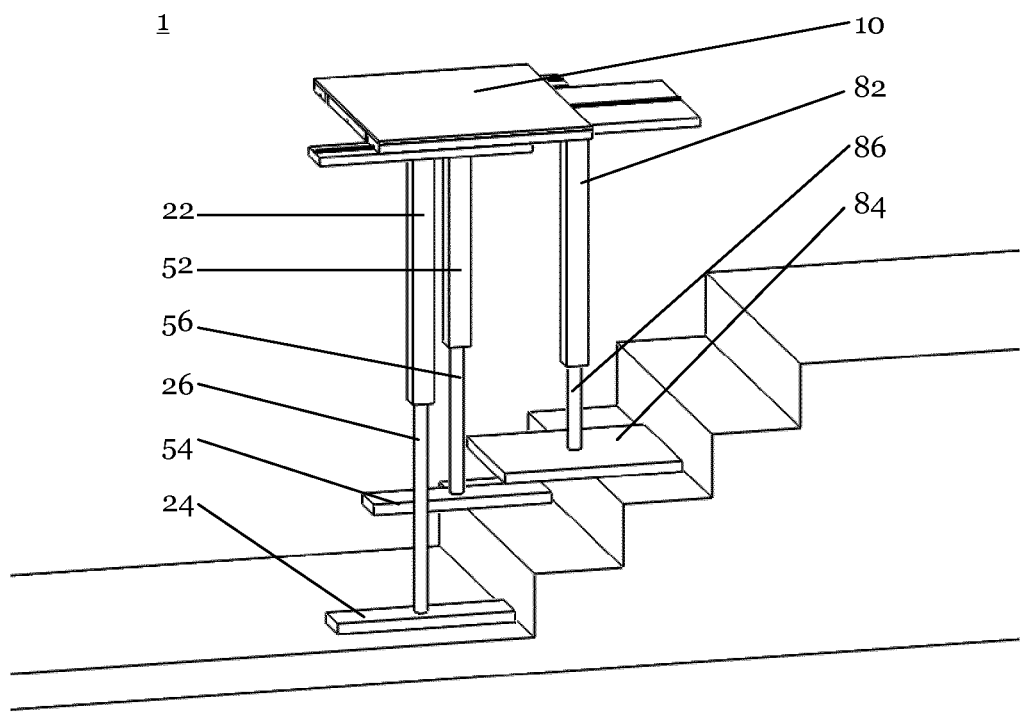

FIG. 5 shows a three-dimensional side view of the second embodiment of the transport device 1, showing the transport device 1 with—compared to the first embodiment—longer vertical actuators 26, 56, 86 and shafts 22, 52, 82, wherein the transport device 1 executes a further variant of stair climbing. By providing longer walking elements 20, 50, 80 it is possible for the transport device 1 to stand on more than two different levels of height, in particular stair steps. So it is possible to realize several other methods of stair climbing, wherein the transport device 1 stands at least sometimes on more than two stair steps.

Figure 6:
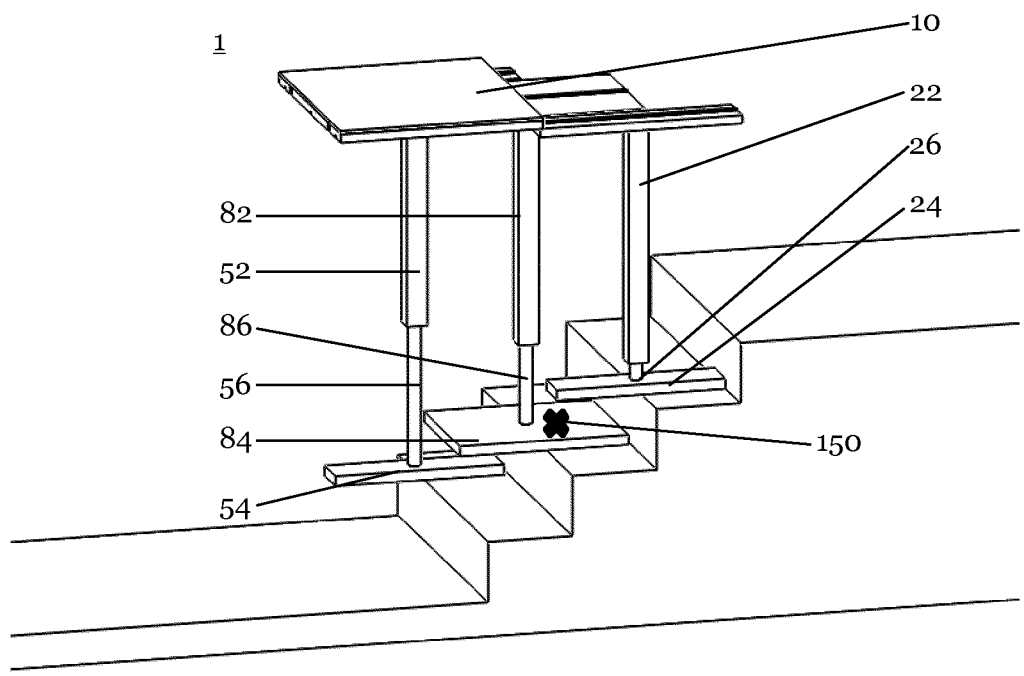

FIG. 6 shows a three-dimensional side view of the second embodiment of the transport device 1, showing the transport device 1 in another phase of the alternative method of stair climbing. In comparison to FIG. 5, the transport device 1 of FIG. 6 moved its first side walking element 20 forward by driving the corresponding horizontal actuator 28 forward until the ground touching portion 24 of the first side walking element 20 is over the next step of the stairs. In this alternative method of the stair climbing, it is always ensured that the centre of mass 150 projected to the ground lies stable below the ground touching portion 84 of the central walking element 80 or in-between the two side walking elements 20, 50.

Figure 7:
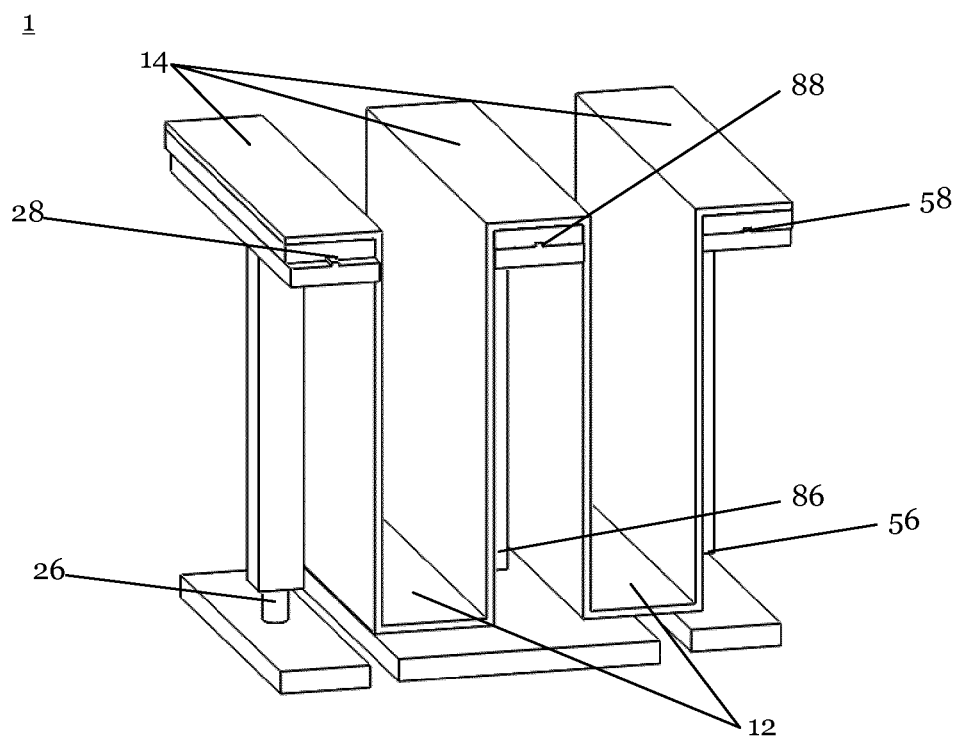
Figure 8:
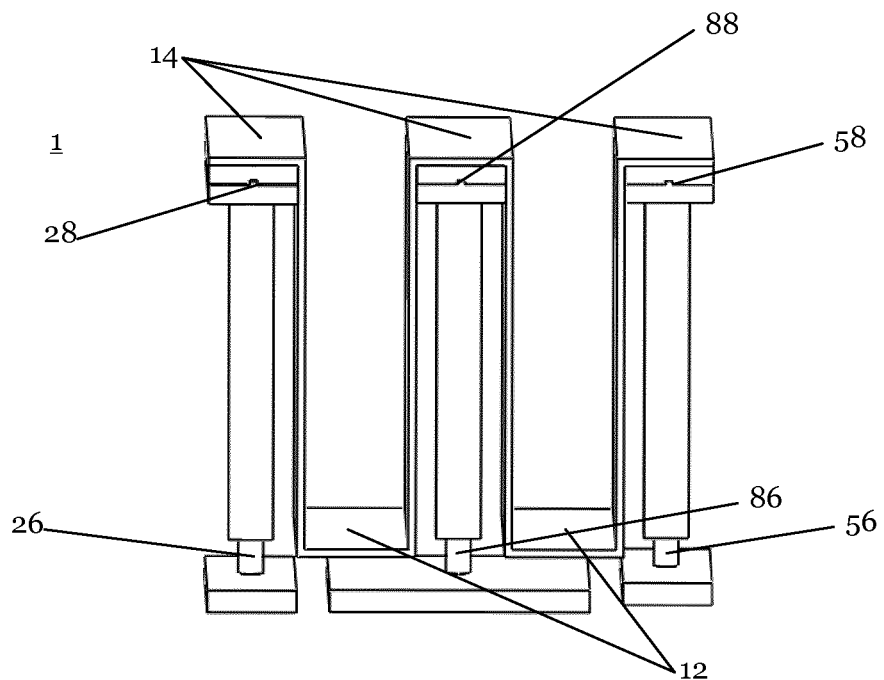

FIGS. 7 and 8 show a three-dimensional view of a third embodiment of the transport device 1, showing two lowered portions 12 of the load carrying body 10 that are arranged in-between actuator support portions 14. It may be desirable for some applications of the transport device 1 to arrange the overall centre of mass as low as possible. When for instance a person should be carried by the transport device 1, it is possible for the person to position his feet on the two lowered portions 12.

Figure 9:
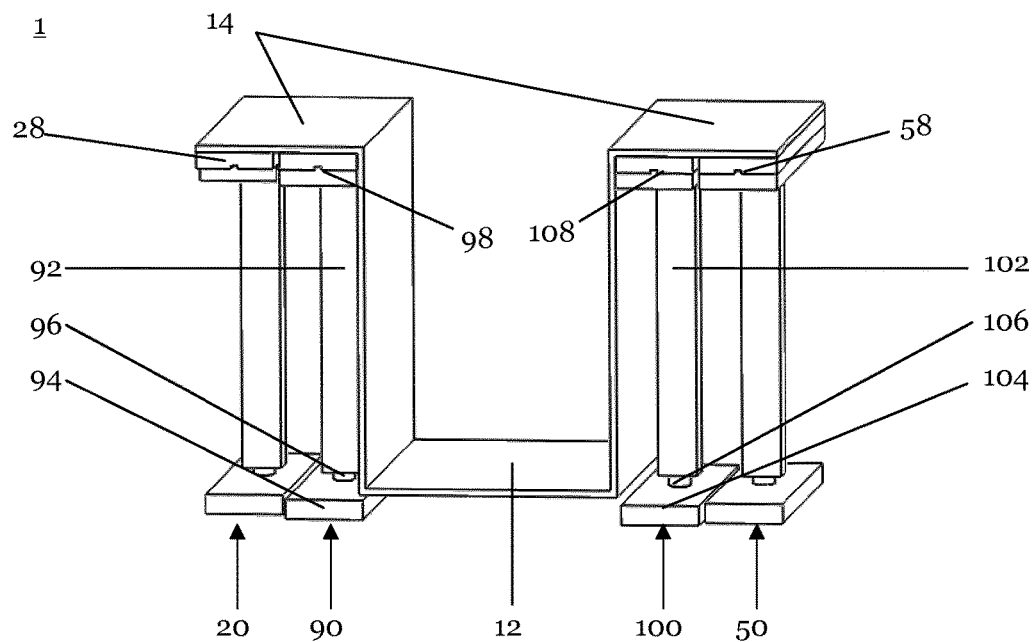
Figure 10:
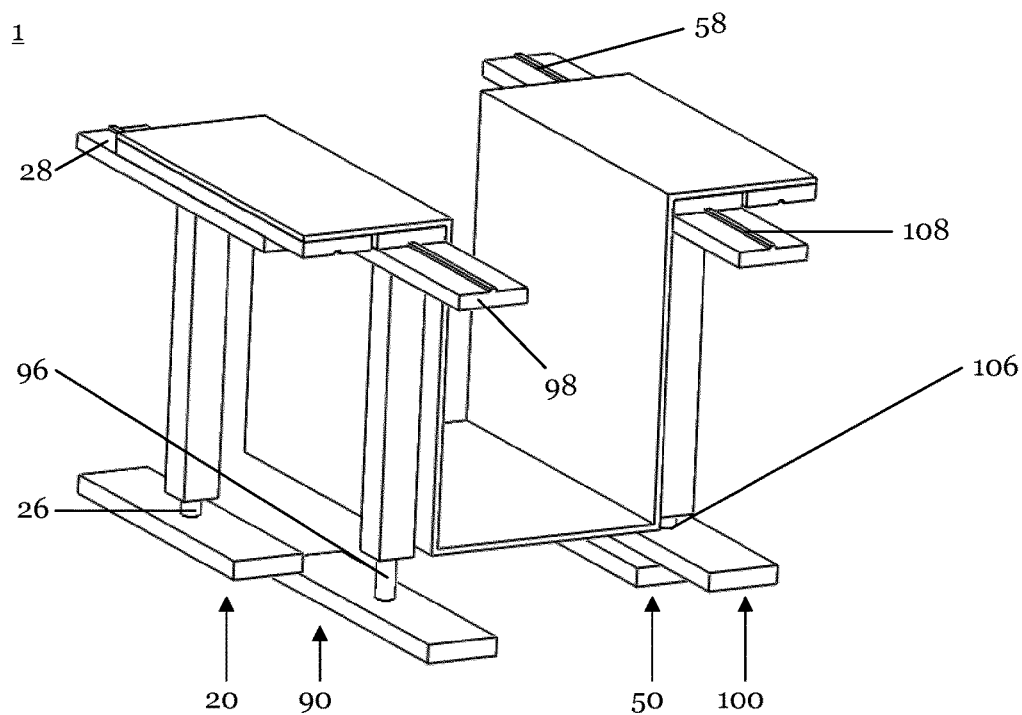

FIGS. 9 and 10 show a three-dimensional view of a fourth embodiment of the transport device 1, with two central walking elements 90, 100 and one central lowered portion 12 of the load carrying body 10 between these two central walking elements 90, 100. This embodiment is considered to be preferably used for transporting goods in order to lower the centre of mass. It can also be used for mounting a seat in order to provide a mobility device for carrying people which prefer to sit whilst the transport device 1 moves forward or passes over obstacles. The two central walking elements 90, 100 comprise the comparable parts than the side walking elements 20, 50 of the first embodiment shown in FIG. 1, namely a shaft 92, 102, a ground touching portion 94, 104, vertical actuators 96, 106 and horizontal actuators 98, 108.

In FIG. 10 the transport device 1 has a slightly raised position standing on one central walking element 90 and on one side walking element 50 with partially slightly displaced walking elements 20, 50, 90, 100. As it can be seen clearly in FIG. 10, it is possible to drive the vertical actuators 26, 56, 96, 106 of the walking elements 20, 50, 90, 100 and in addition to that, the horizontal actuators 28, 58, 98, 108 independently from each other. So it is possible to adapt the transport device 1 to varying conditions of the surrounding environment, in particular changes of the height of sections of the ground. That includes stairs, any kind of other obstacle, and surface structure of the ground.

Figure 11:
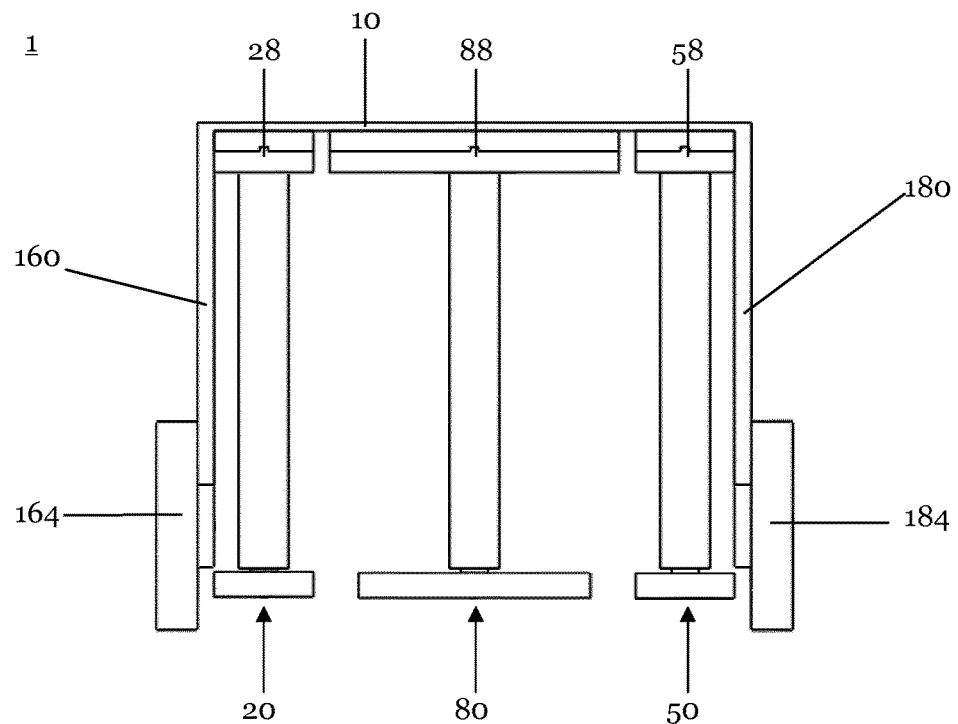
Figure 12:
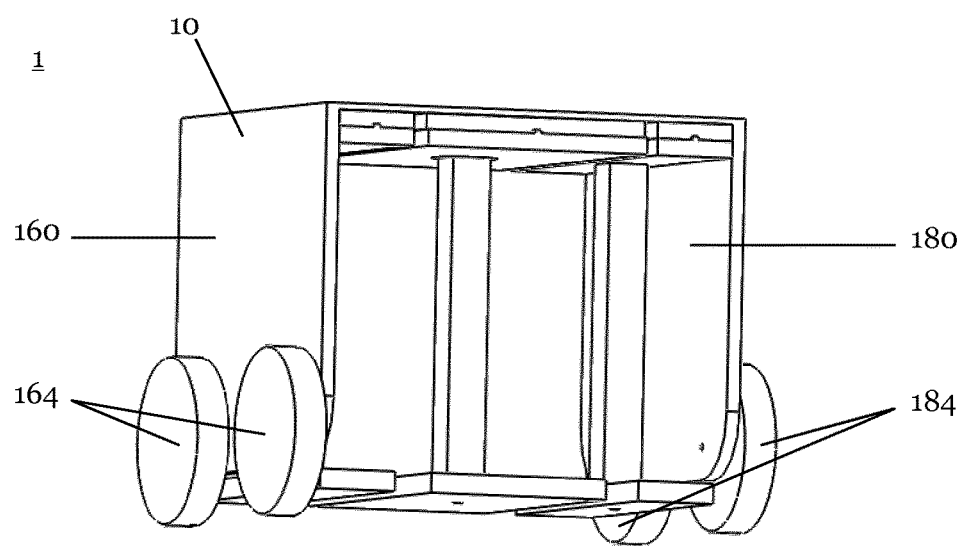
Figure 13:
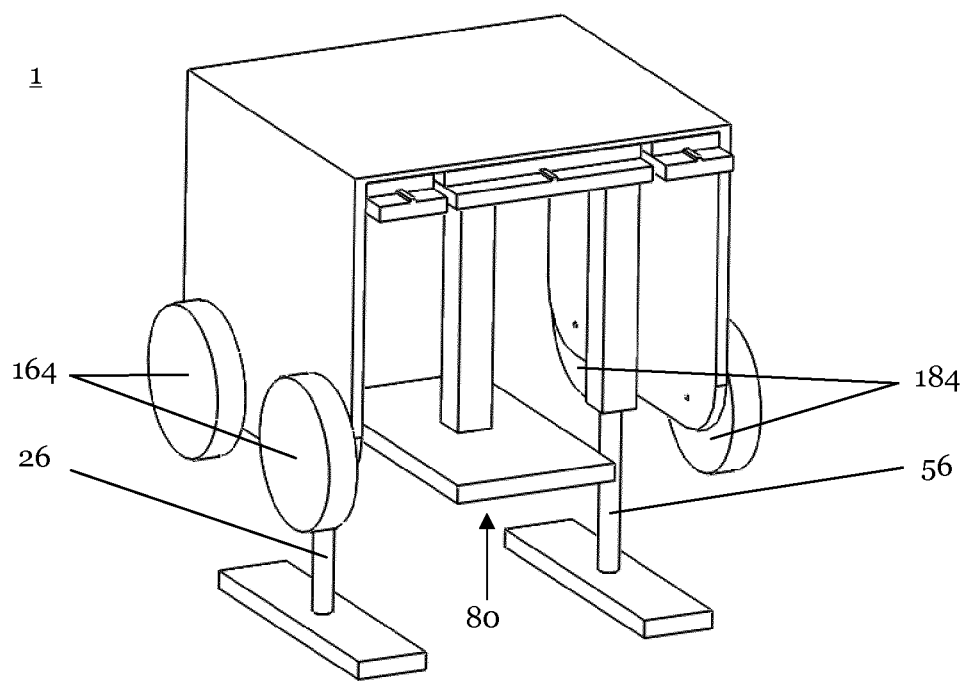

FIGS. 11-13 show a fifth embodiment of the transport device 1, having wheels 164, 184 that are attached to side panels 160, 180 of the load carrying body 10. The side panels 160, 180 are fixed to or part of the load carrying body 10. In addition to a movement by walking the fifth embodiment is capable to drive by wheels 164, 184. This is faster than walking in case the ground has no substantial obstacles. Thereby, at least two but also more of the wheels 164, 184 can be driven by any kind of motor like for instance electric motors.

FIG. 13 shows a three-dimensional view of the fifth embodiment of the transport device 1, showing the transport device 1 in a raised position standing on the two side walking elements 20, 50. By elongating the vertical actuators 26, 56 the ground touching portions 24, 54 contact the ground and lift the wheels 164, 184 from the ground. Therefore, no additional vertical actuators for the wheels 164, 184 are necessary.

Figure 14:
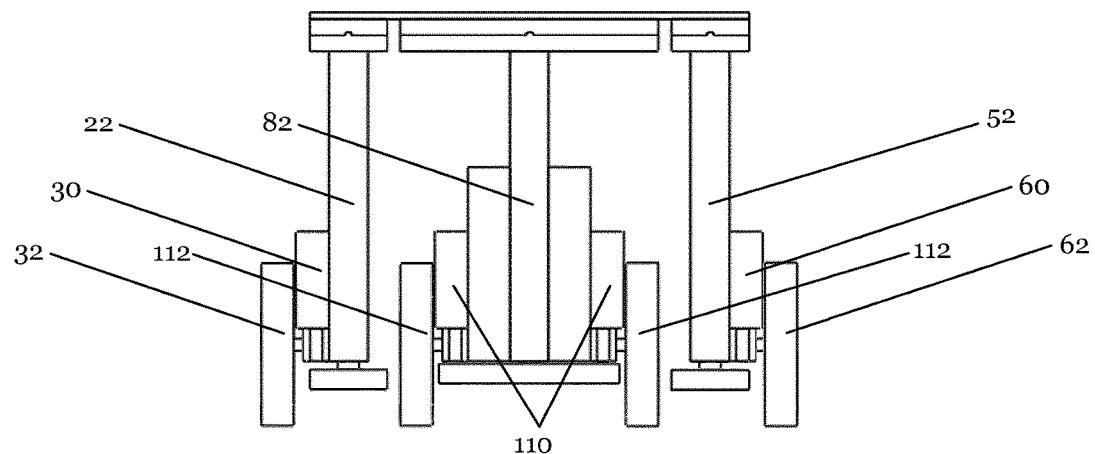
Figure 15:
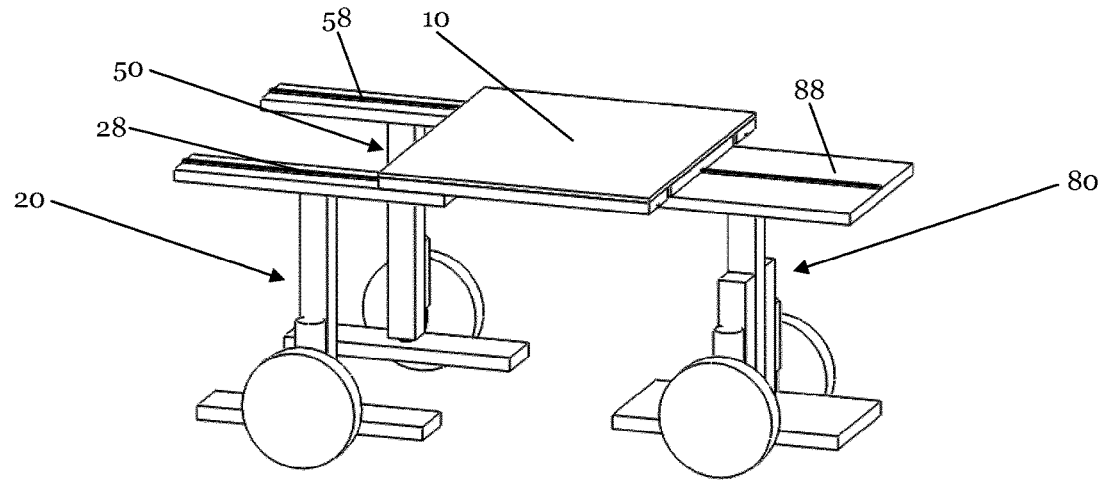
Figure 16:
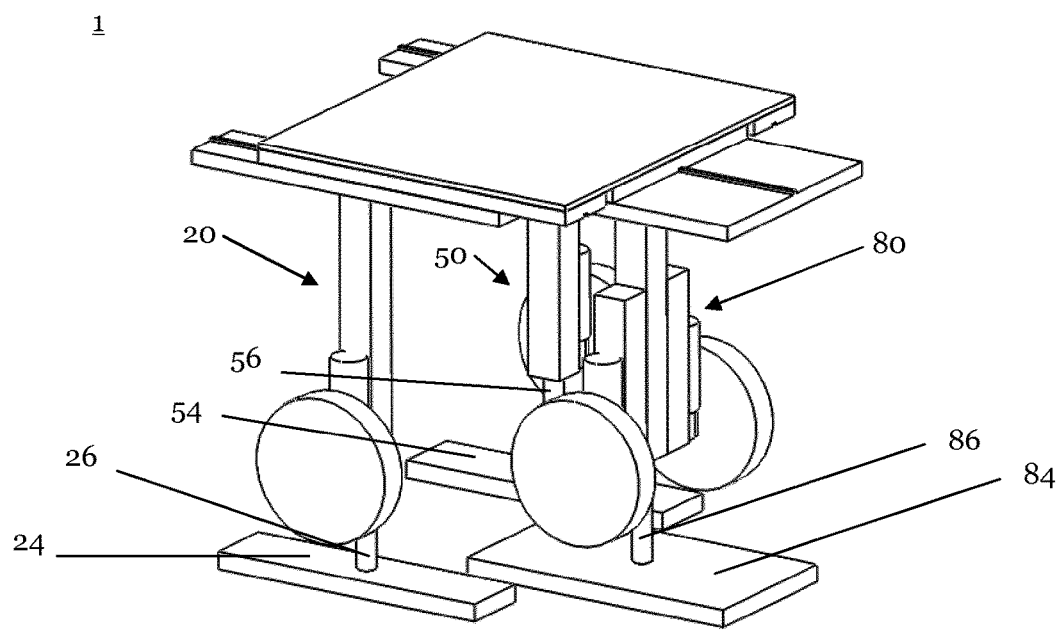
Figure 17:
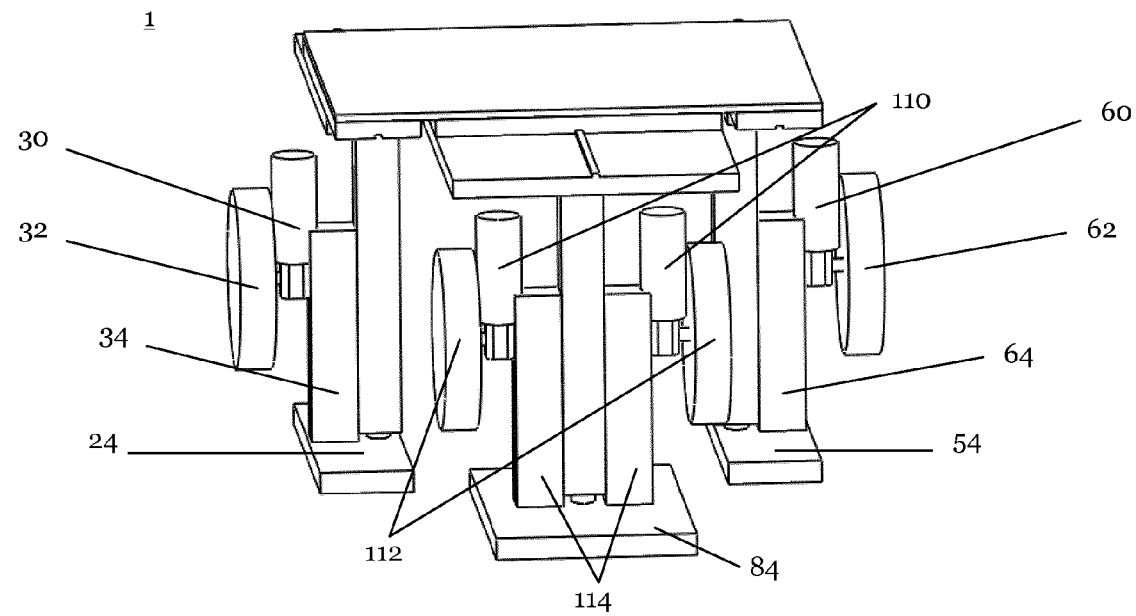

FIGS. 14-16 show a sixth embodiment of the transport device 1, comprising wheels 32, 62, 112 which are fixed to the shafts 22, 52, 82 of the walking elements 20, 50, 80. The wheels 32, 62, 112 are driven by motors 30, 60, 110.

FIG. 15 shows a three-dimensional view of the sixth embodiment of the transport device 1, showing the transport device 1 with—in lateral direction—maximum extended walking elements 20, 50, 80. This constellation of maximum extended horizontal actuators 28, 58, 88 and retracted ground touching portions 24, 54, 84 of the walking elements 20, 50, 80 is the configuration of the so called "drive mode". In the drive mode, the entire transport device 1 including its load is in the state of maximum stability because of the horizontally extended walking elements 20, 50, 80. But of course it is obvious that the transport devices 1 according to the invention are able to drive with the wheels at any state of the horizontal actuators 28, 58, 88 and is not limited to the "drive mode" described above.

FIG. 16 shows a three-dimensional view of the sixth embodiment of the transport device 1, showing the transport device 1 standing in a raised position on all three ground touching portions 24, 54, 84 with—in horizontal direction—slightly extended walking elements 20, 50, 80. Because of the fact that the wheels are rigidly fixed to the shafts 22, 52, 82 of the walking elements 20, 50, 80, the walking elements 20, 50, 80 are extended in vertical direction via the vertical actuators 26, 56, 86 in order to switch from the drive mode to the walking mode.

FIGS. 17-21 show a seventh embodiment of the transport device 1. The transport device 1 comprises wheels 32, 62, 112, that are fixed to vertical wheel suspension actuators 34, 64, 114, which are fixed to the ground touching portions 24, 54, 84 of the walking elements 20, 50, 80. In this configuration it is possible to vary actively the vertical position of the wheels 32, 62, 112 in respect to the walking elements 20, 50, 80 by means of the vertical wheel suspension actuators 34, 64, 114. This embodiment additionally comprises motors 30, 60, 110 for driving the wheels 32, 62, 112.

In an alternative embodiment (not shown) the wheels 32, 62, 112 can be attached to the lower end of the walking elements 20, 50, 80 without vertical wheel suspension actuators. In such an embodiment the transport device could walk on the wheels 32, 62, 122 if the wheels are braked. Further, of course, the wheels 32, 62, 122 can be used for driving the transport device.

Figure 18:
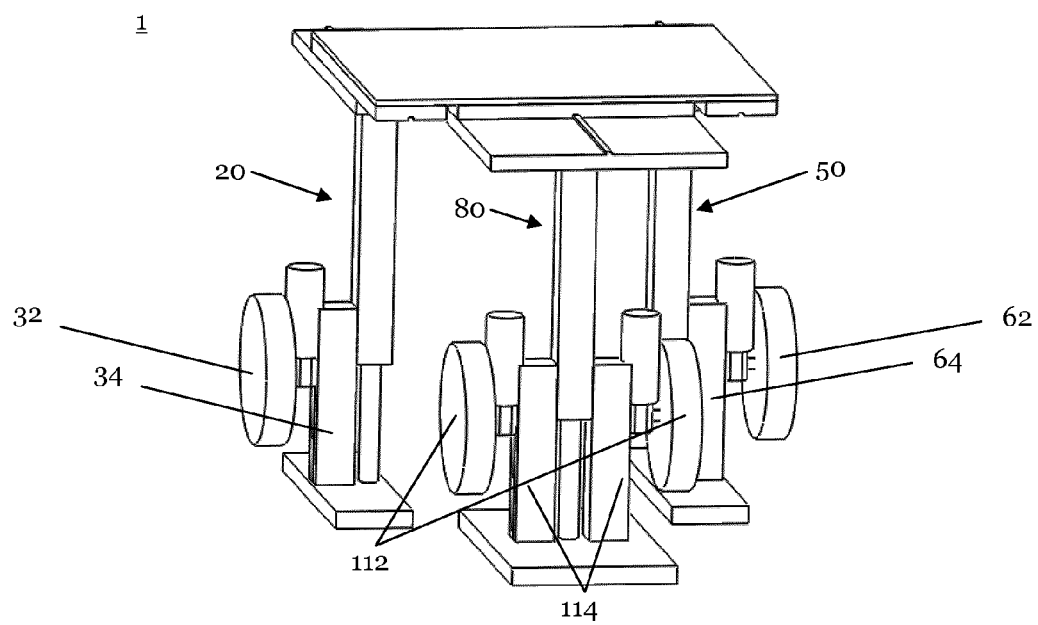

FIG. 18 shows a three-dimensional front view of the seventh embodiment of the transport device 1, showing the transport device 1 standing in a raised position on all three ground touching portions 24, 54, 84 with—in lateral direction—slightly extended walking elements 20, 50, 80.

Figure 19:
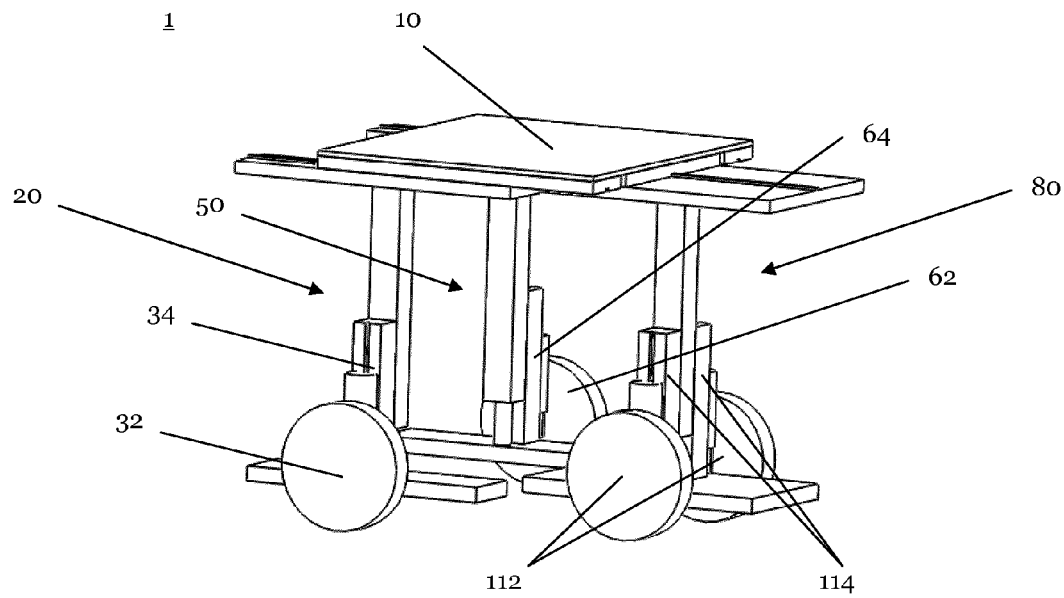

FIG. 19 shows a three-dimensional side view of the seventh embodiment of the transport device 1, showing the transport device 1 driving on the wheels 32, 62, 112. As it can be clearly seen in FIGS. 18 and 19, the vertical position of the wheels 32, 62, 112 is independent from the position of the vertical actuators 26, 56, 86 of the walking elements 20, 50, 80. Thereby, it is possible to move the transport device 1 with a raised load carrying body 10 by driving on the wheels 32, 62, 112, when the vertical wheel suspension actuators 34, 64, 114 are driven in a way that the wheels 32, 62, 112 touch the ground.

Figure 20:
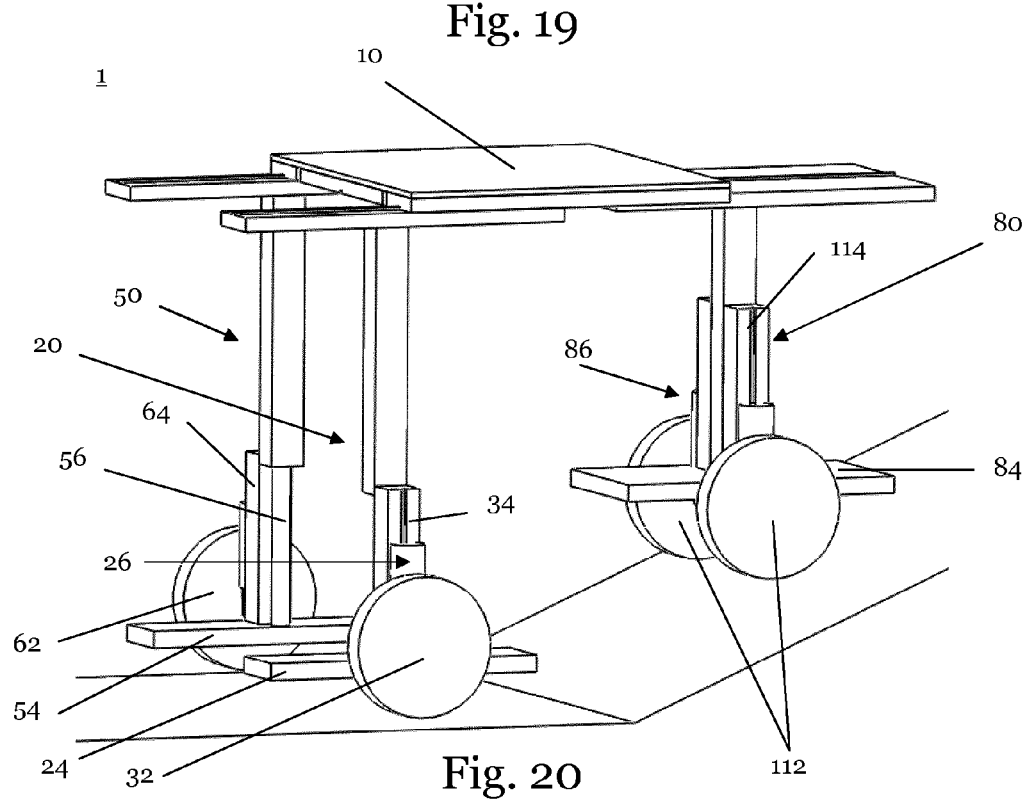
Figure 21:
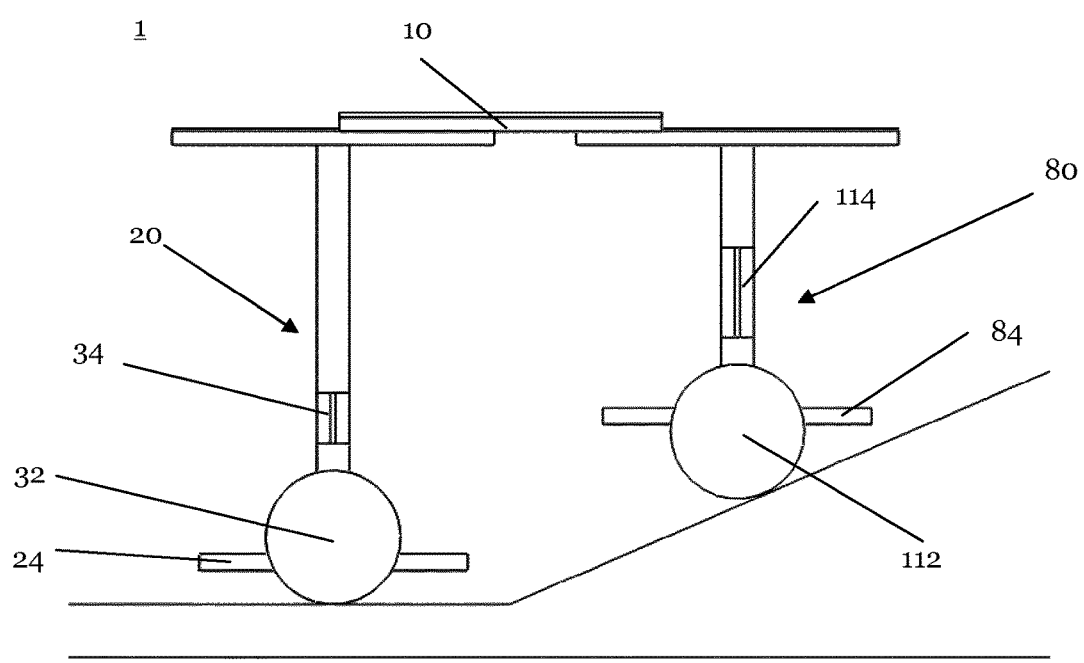
Figure 22:
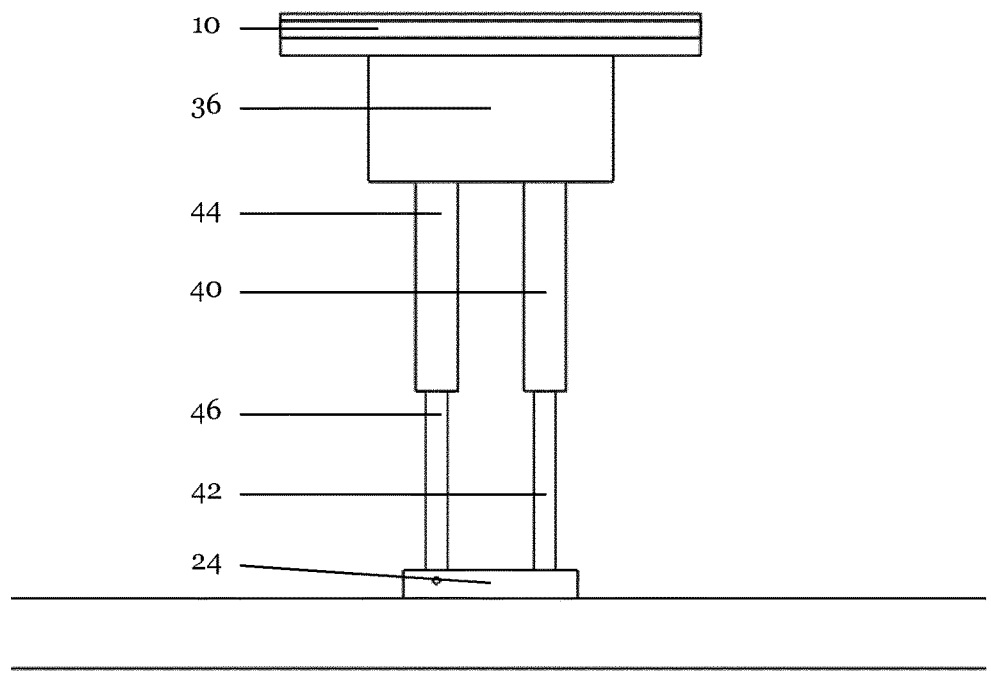
Figure 23:
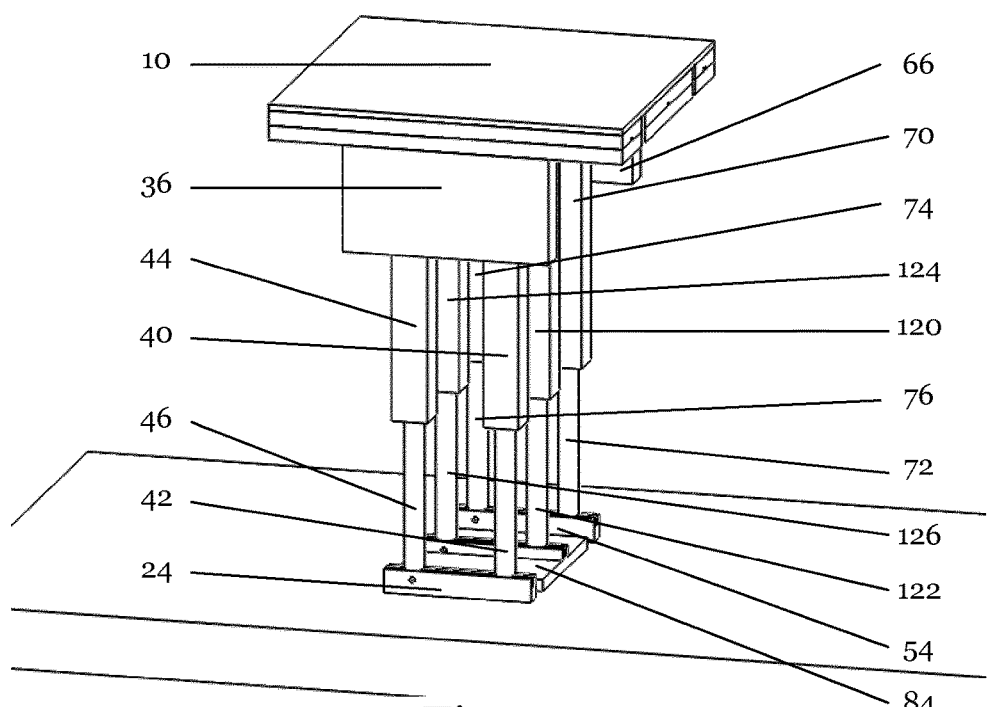

FIGS. 20 and 21 show the seventh embodiment of the transport device 1 rolling upwards a ramp, wherein the vertical actuators 26, 56, 86 of the walking elements 20, 50, 80 are driven in a way, that the load carrying body 10 stays in the horizontal. As it can be seen from FIG. 20, the vertical wheel suspension actuators 34, 64, 114 can be driven independently from each other, that enables that the wheels 32, 62, 112 may be extended below the ground touching portions 24, 54, 84 to different levels. Thereby, it is possible—like it is shown in FIG. 20—that the transport device 1 can drive upwards a ramp wherein the load carrying body 10 stays horizontally. Thereby, the ground touching portions 24, 54, 84 are spaced apart from the ground in a way that they do not touch the ground when the transport device 1 drives upwards the ramp.

Figure 24:
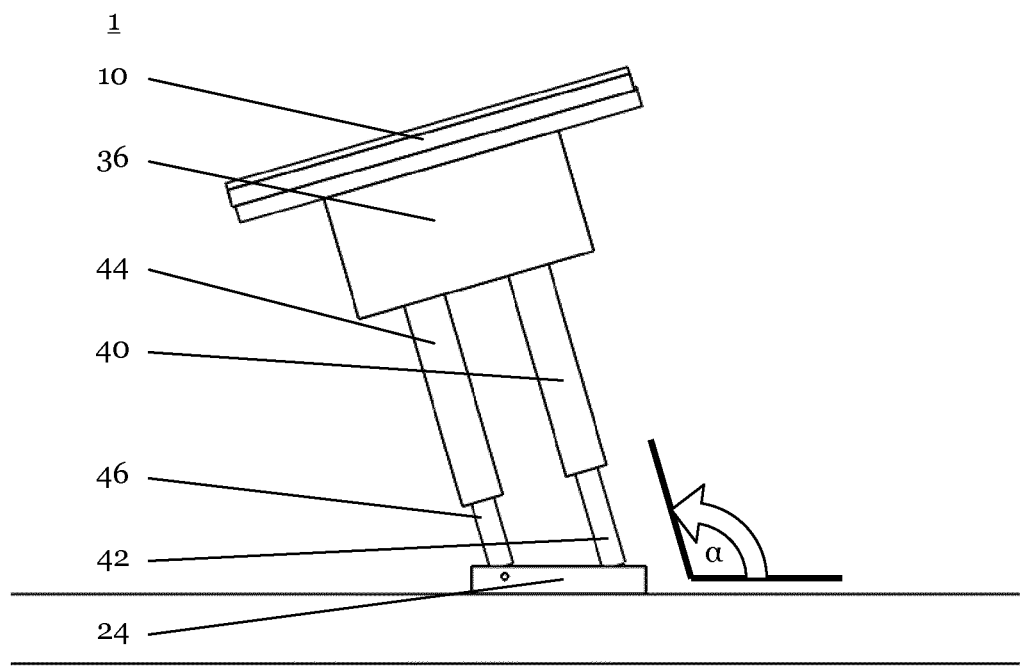
Figure 25:
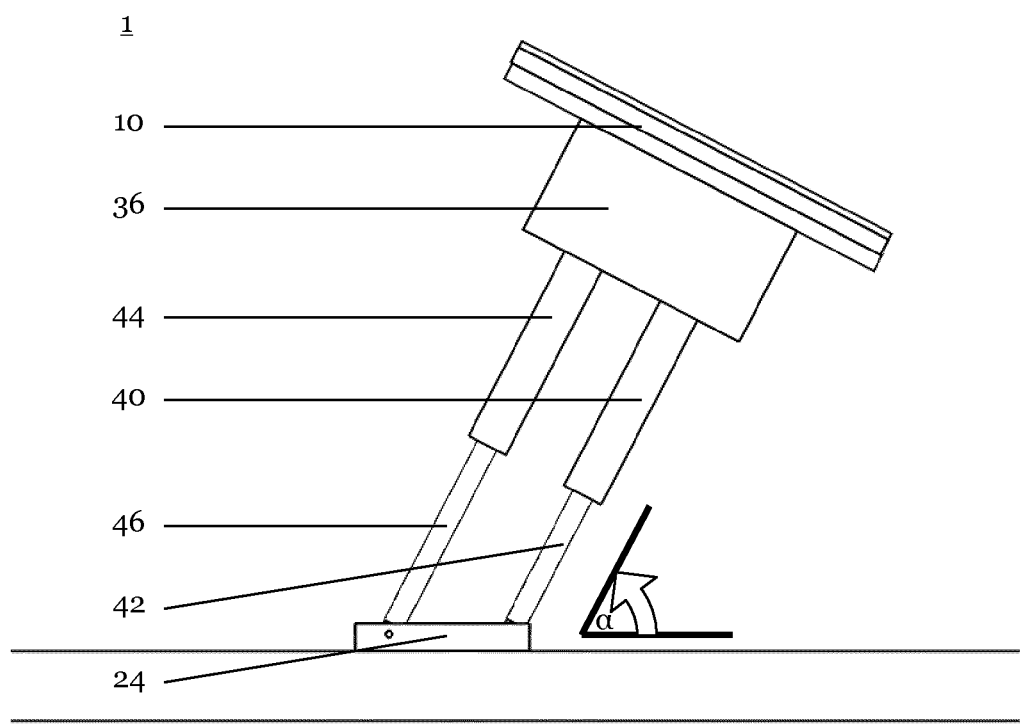
Figure 26:
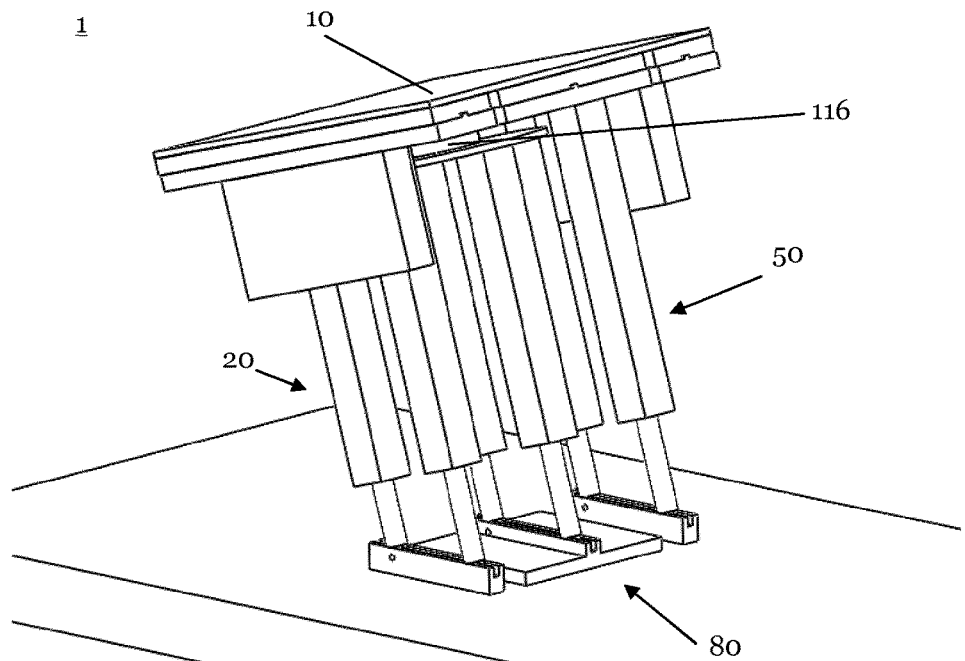

FIGS. 22-25 show an eighth embodiment of the transport device 1, wherein the transport device 1 has two vertical actuators 42, 46, 72, 74, 122, 126 per walking element 20, 50, 80. The eighth embodiment comprises side portions 36, 66 and ground touching portions 24, 54, 84 that have one hinge and one slide bearing per ground touching portion 24, 54, 84. Thereby, the transport device 1 is able to lean forwards and backwards as shown in FIGS. 24 and 25.

In FIG. 24 the transport device 1 is tilted backwards by driving the vertical actuators 42, 46, 72, 76, 122, 126 of the transport device 1 in a way so that the front vertical actuators 42, 72, 122 are extended more than the back ones 46, 76, 126. It is obvious that all front vertical actuators 42, 72, 122 have to be driven in parallel as well as the back vertical actuators 46, 76, 126 have to be driven in parallel in order to achieve a variation of the angle of the load carrying body 10 without losing the contact to the ground. This feature of tilting the transport device back or forth may be preferred for transporting special kinds of goods or in order to achieve a stable system by moving the projected centre of mass 150 below of the loaded ground touching portions 24, 54, 84.

FIG. 25 shows the transport device 1 tilting forwards by driving the vertical actuators 42, 72, 122 of the transport device 1 in a way so that the front vertical actuators 42, 72, 122 are extended less than the back ones 46, 76, 126. Transport device 1 can be tilted freely backwards and forwards as it is shown in FIGS. 24 and 25. The only limitation of this movement is that the transport device 1 including its load is always in a stable condition. FIGS. 26-33 shows a ninth embodiment of the transport device 1, showing the transport device 1 being tilted backwards, comprising a rotatory actuator 116 between the horizontal actuator 88 and the shaft 82 of the central walking element 80.

FIGS. 26-33 show a ninth embodiment of the transport device 1, wherein the transport device 1 is tilted backwards, comprising a rotatory actuator 116 between the horizontal actuator 88 and a shaft 82 of the central walking element 80.

Figure 27:
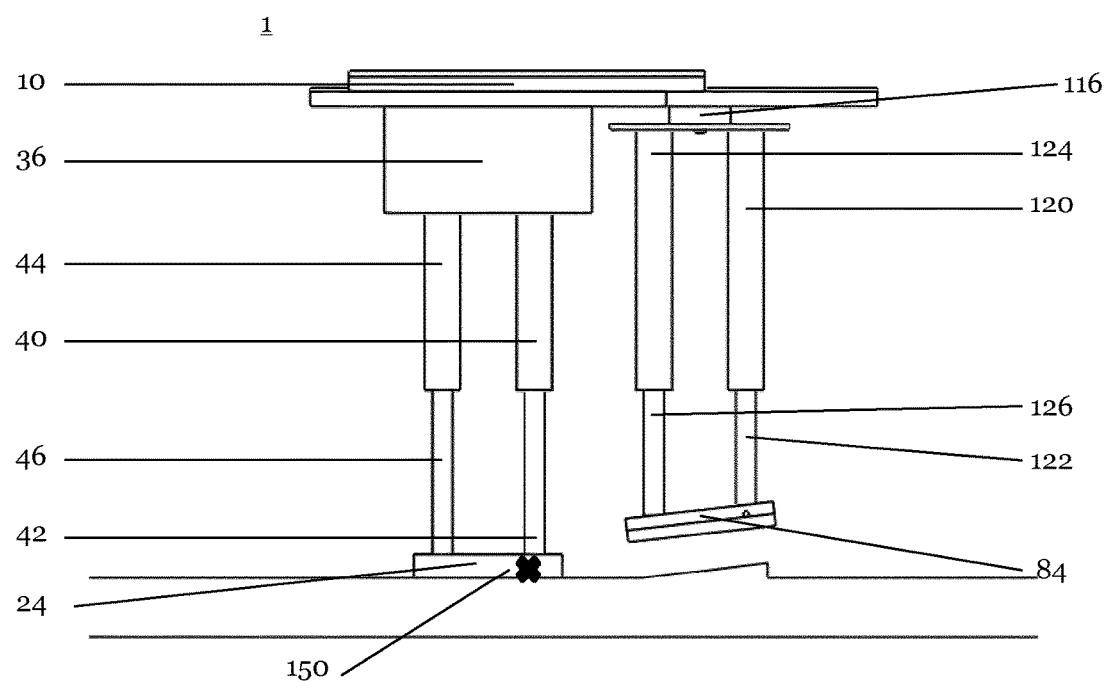

FIG. 27 shows a schematic side view of the ninth embodiment of the transport device 1, wherein the transport device 1 is in the phase of adapting the orientation of the central ground touching portion 84 to the orientation of the ground. As it can be seen in FIG. 27, the central ground touching portion 84 is adapted to the slope of the ground before the central ground touching portion 84 touches the ground. But it is also possible that the adaptation of to the slope of the ground is done while the ground touching portion 84 is lowered. In particular, the ground touching portion 84 is lowered in any angle until a first end of the ground touching portion 84 touches the ground and the corresponding actuator stops driving wherein the other actuator goes on lowering down the corresponding portion of the ground touching portion 84 until the second end of the ground touching portion also touches the ground. In this embodiment it does not matter whether at first the front or the back part of the ground touching portion that touches the ground first until it stops if the ground is reached.

Figure 28:
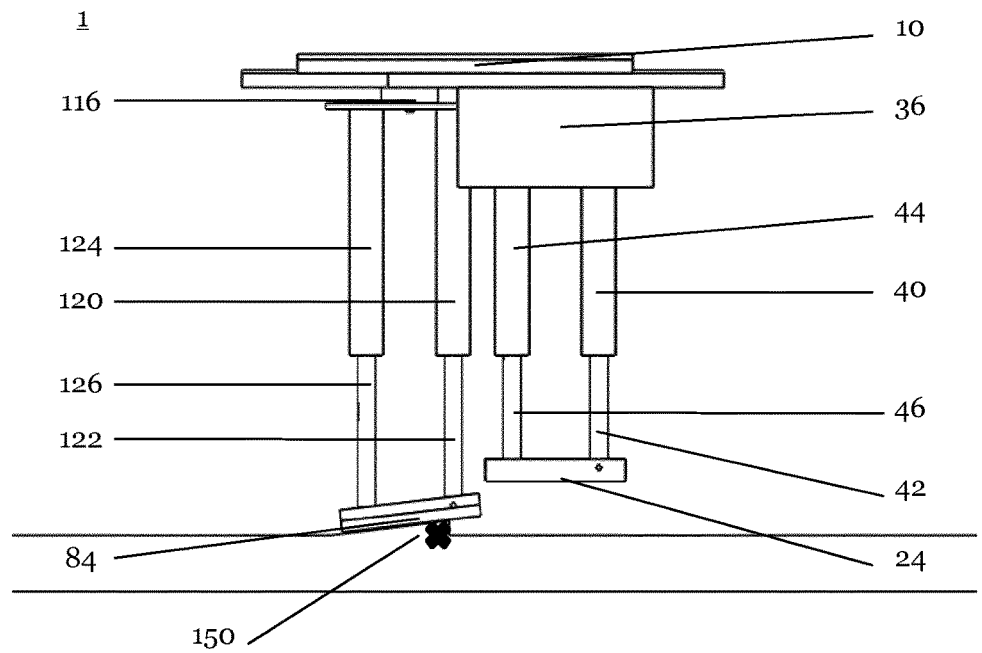
Figure 29:
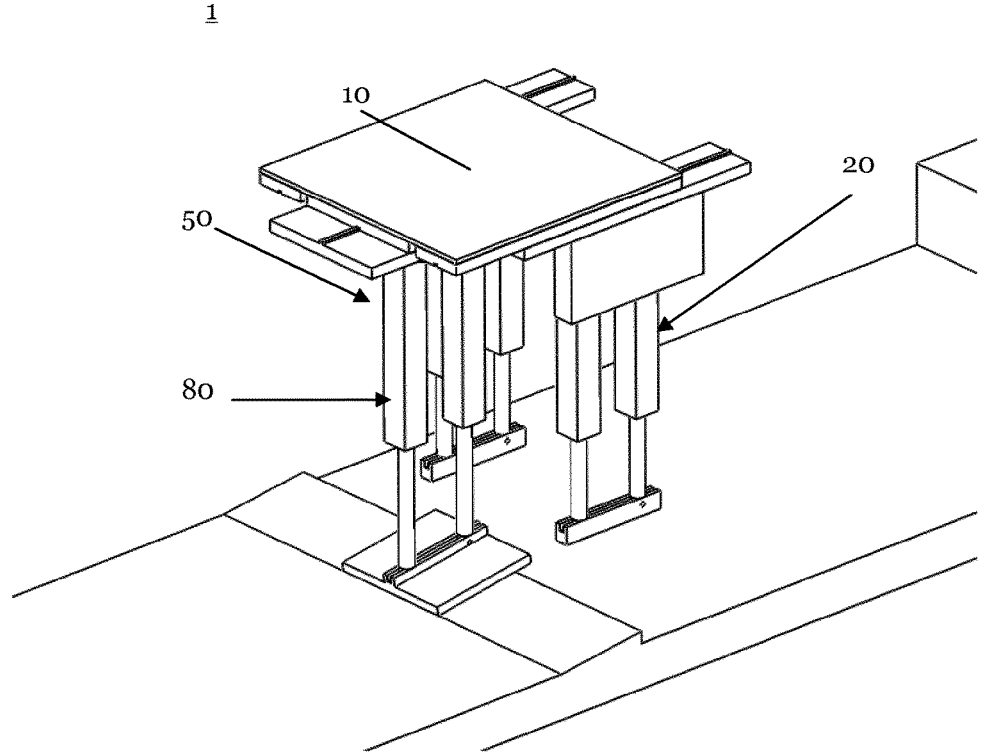

In FIG. 28 the transport device stands on the adapted ground touching portion 84 of the central walking element 80. The adaptation of the central walking element 80 can of course be done for the two side walking elements 20, 50. It is not necessary that the front vertical actuators 42, 72 and the two rear vertical actuators 46, 76 are driven in parallel. That means it is possible that the two ground touching portions 24, 54 of the side walking elements 20, 50 are not positioned in parallel but are optimally adapted to the orientation of the ground at the specific point where the ground touching portions 24, 54 contact the ground.

Figure 30:
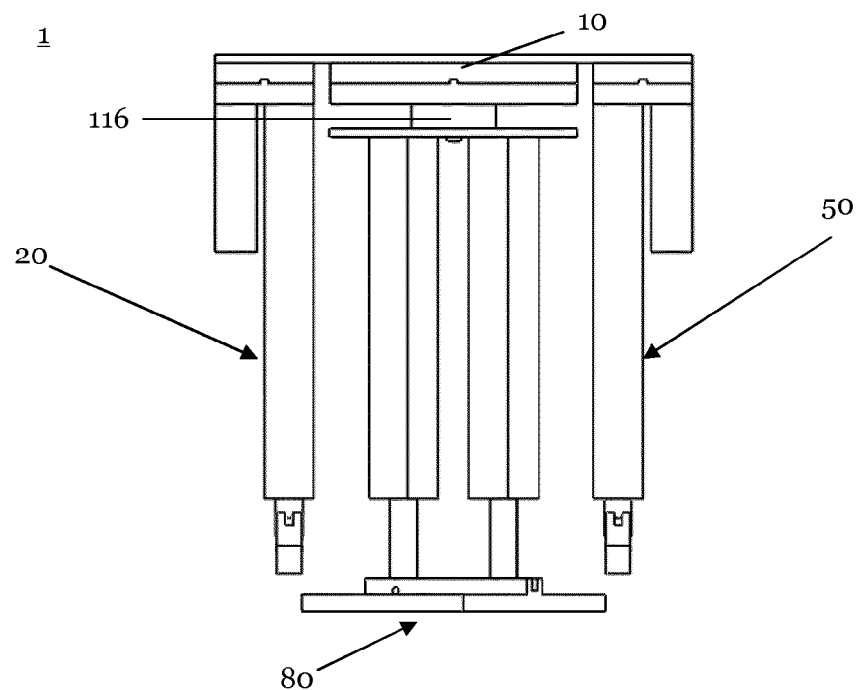

In FIG. 30 the transport device 1 stands on the central ground touching portion 84, wherein the transport device 1 has executed a rotation by the use of the rotatory actuator 116.

Figure 31:
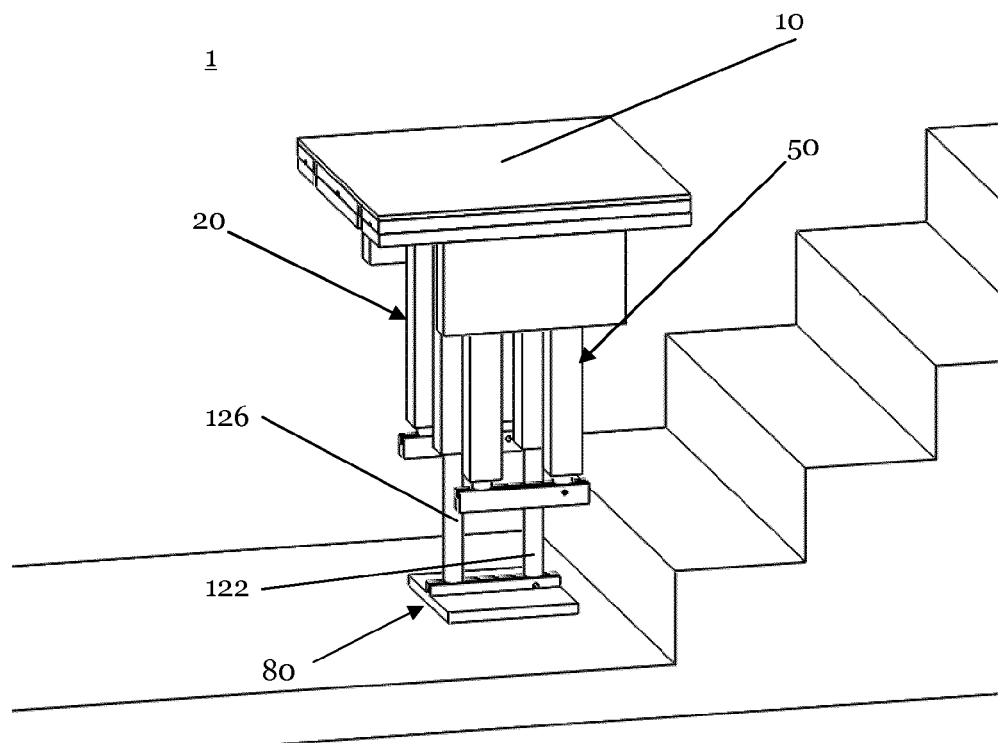
Figure 32:
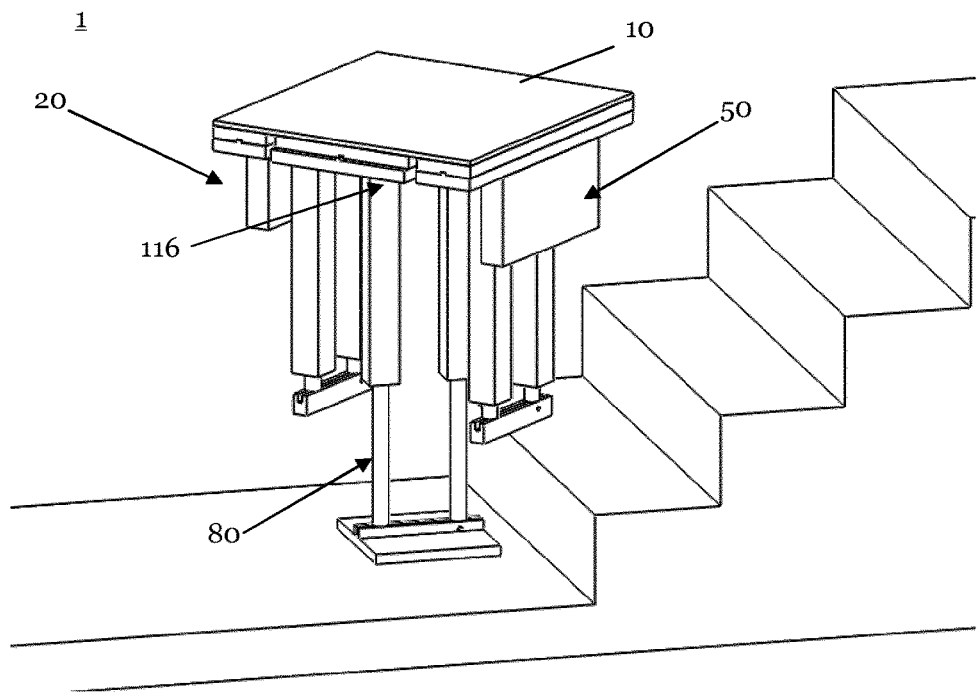
Figure 33:
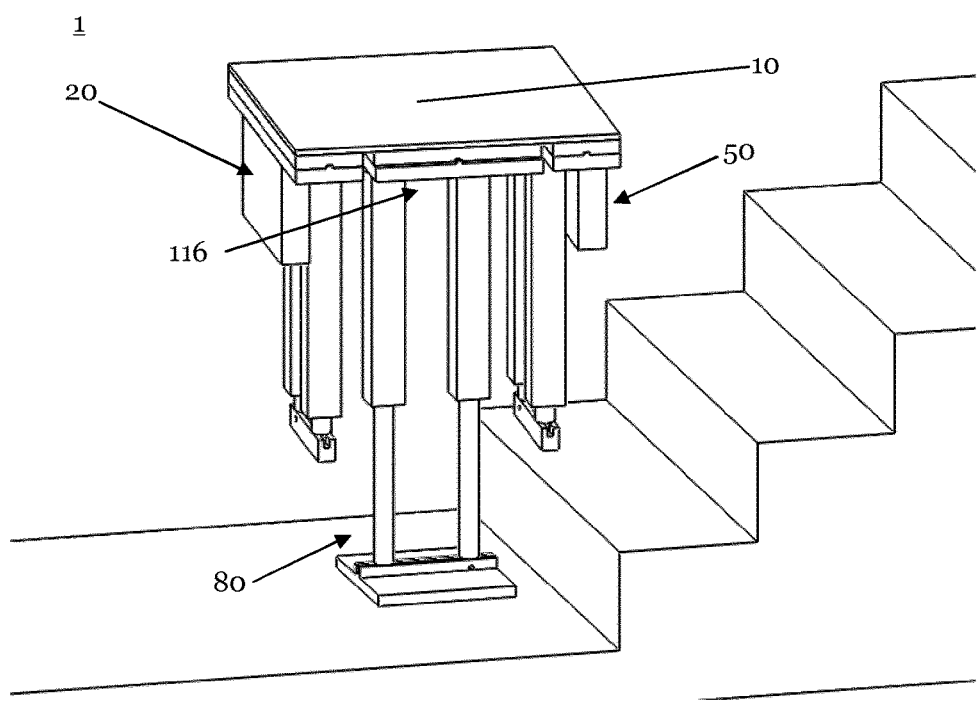

The FIGS. 31-33 a sequence of figures in which the transport device 1 is standing in a raised position solely on the central walking element 80 and is rotating around the vertical axis by means of the rotatory actuator 116. The rotatory movement can be executed in both directions, leftwards and rightwards and to any desired rotation angle.

Figure 34:
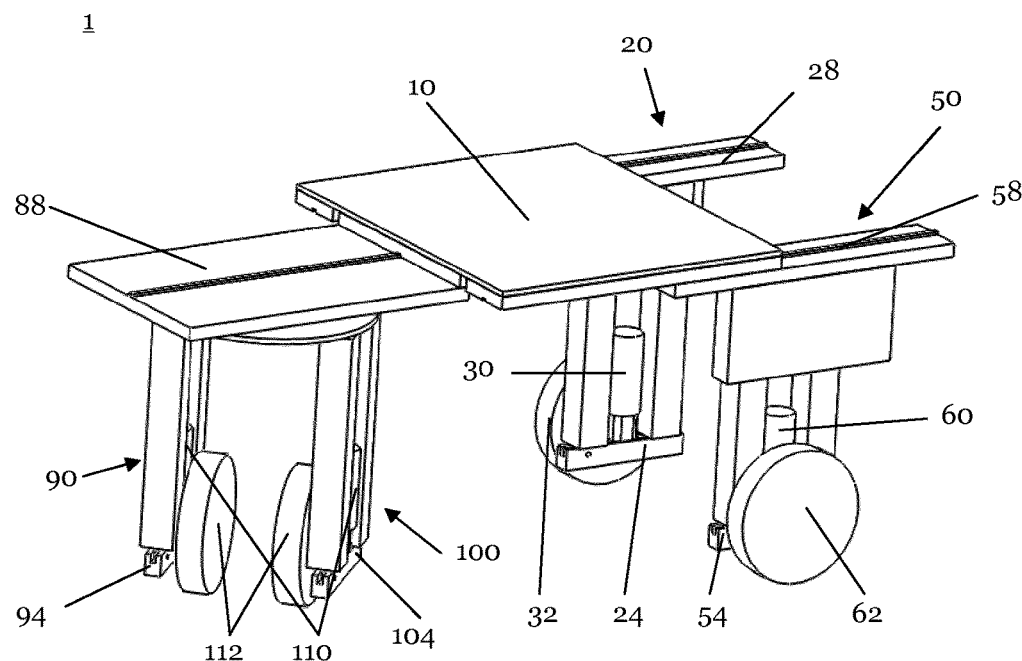

FIG. 34 shows a three-dimensional view of a tenth embodiment of the transport device 1, wherein the central walking element 80 comprises two sets of vertical actuators and ground touching portions 94, 104. The corresponding wheels are arranged between the ground touching portions 94, 104. As it can be also seen from FIG. 34, it is possible to arrange motors 30, 60, 110 in between front and back vertical actuators 42, 46 and 72, 76 and 122, 126. As it can be also seen from FIG. 34, the transport device 1 stands on the wheels 32, 62, 112 so that the transport device 1 is in the drive mode. In this mode, the rotatory actuator 116 can be used to steer the transport device 1 in the desired direction.

Figure 35:
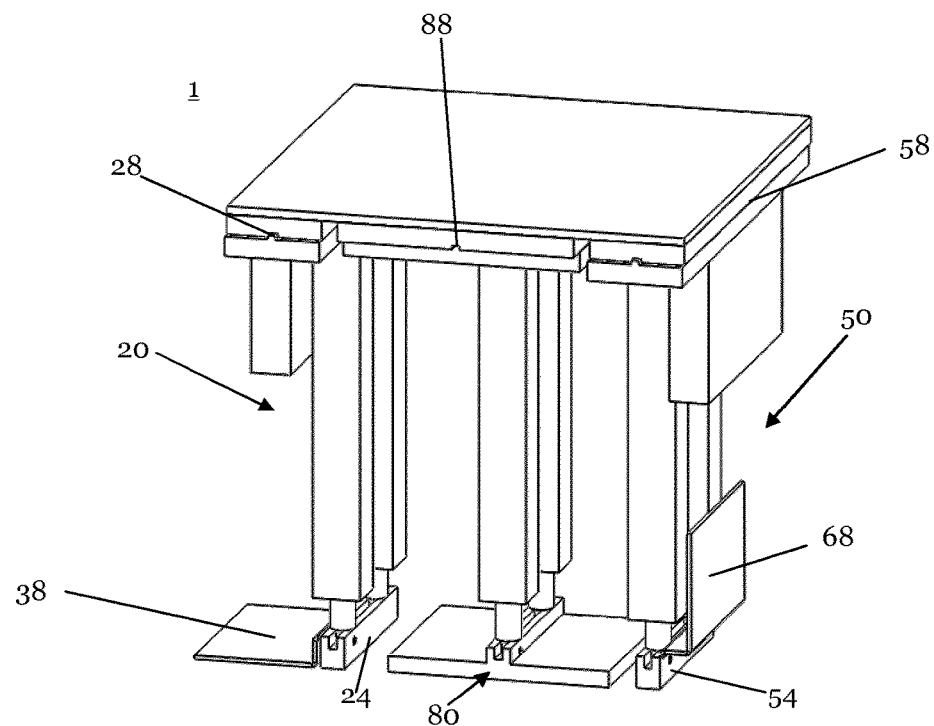

FIG. 35 shows a three-dimensional view of an eleventh embodiment of the transport device 1, showing the transport device 1 with base enlargement portions 38, 68 attached to the outer side of the side walking elements 20, 50. These base enlargement portions 38, 68 may be hinged down and locked to the ground touching portions 24, 54 of the side walking elements 20, 50 in order to enlarge the footprint on which the transport device 1 stands. That is especially favourable for soft grounds, for instance sand, so that the transport device will not sink in too much.

Figure 36:
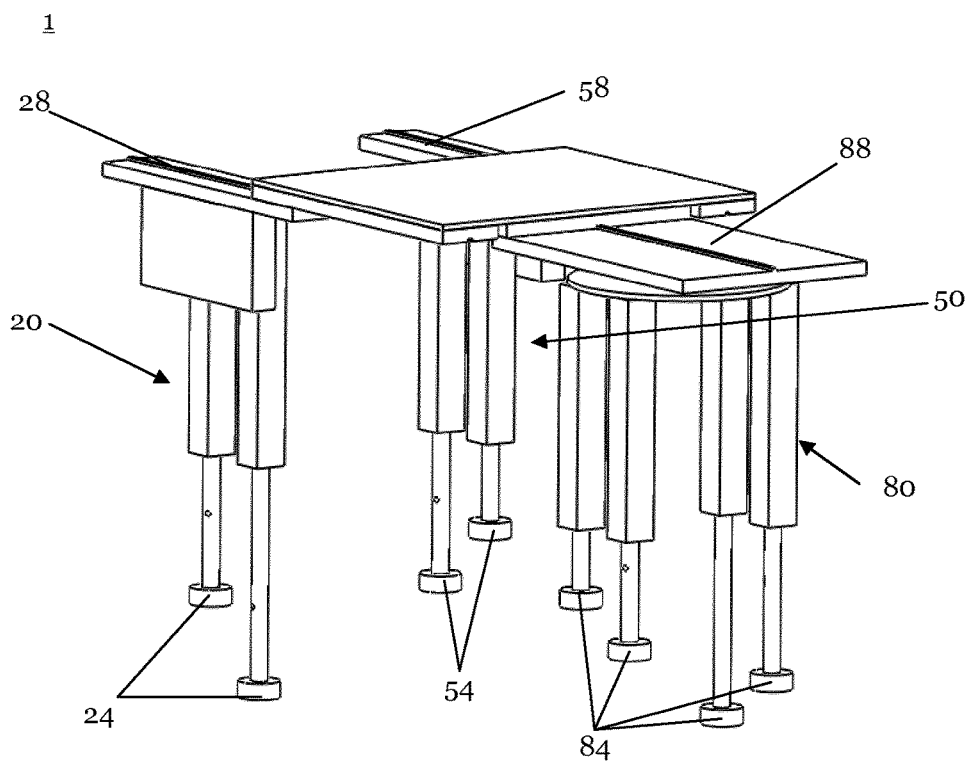
Figure 37:
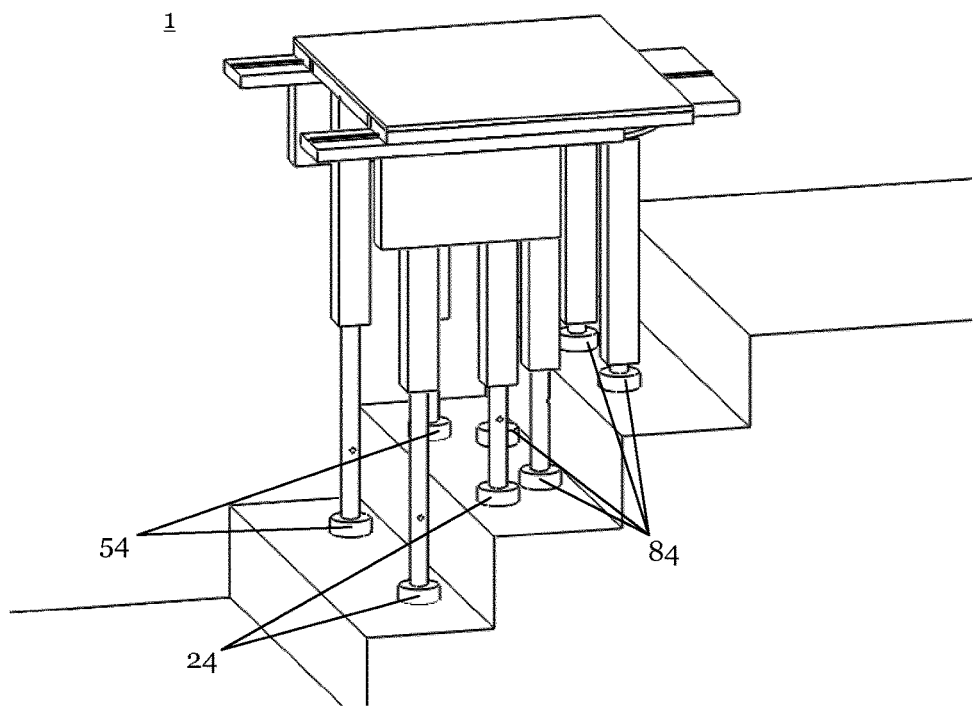

FIGS. 36-37 show a twelfth embodiment of the transport device 1, having separate ground touching portions 24, 54, 84 for each vertical actuator. In this embodiment, it is also possible to adapt the transport device 1 to the ground. This configuration is particularly favourable for types of grounds, which are very uneven. In this embodiment each ground touching portion 24, 54, 84 can be individually lifted and adapted to the ground.

In an alternative embodiment the plate shaped ground touching portions 24, 54, 84 of the vertical actuators could be replaced by small electrically driven wheels (not shown) such that the transport device 1 can drive on wheels if the ground is even. If the ground is uneven, the transport device 1 can walk on braked wheels that simply serve as rigid ground touching portions.

FIG. 37 shows transport device 1 climbing stairs in a third method of climbing. It has to be mentioned that it is possible in this way of climbing to position ground touching portions 24, 54, 84 of one walking element on different height levels, here different steps of stairs. Thereby, the ground touching portions 24, 54, 84 can be positioned on a plurality of steps simultaneously.

FIGS. 38a-42b show a preferred embodiment of the method of overcoming uneven ground by means of the thirteenth embodiment of the transport device 1 in a chronological sequence of pictures, wherein the chronology is determined by the picture number 38, 39, 40, . . . and "a" and "b" of the same number describe the same phase but from differing points of view. The thirteenth embodiment of the transport device 1 comprises a hinge 118 between the front vertical actuator 121 and the rear vertical actuator 126 of the central walking element 80, wherein the rotation axis of the hinge 118 is parallel to the back and forth movement direction of the transport device 1. By the use of this hinge 118 it is possible to adapt the central ground touching portion 84 to the orientation of the ground in the direction orthogonal to the direction of the back and forth movement of the transport device 1.

The hinge 118 is lockable. That means it is possible to lock the hinge 118 in any angular position after the ground touching portion 84 of the central walking element 80 adopts the desired position. By locking the hinge 118 it is not possible to change the angle between the shaft 82 of the central walking element 80 and the ground touching portion 84 anymore. That means that in case that the transport device 1 stands solely on the central walking element 80 it stands stable and does not tilt around the axis of the hinge. As shown in FIGS. 38a and 38b, the transport device 1 stands on one portion of the ground that has a slope.

This slope is compensated by the different lengths of the side walking elements 20, 50 so that the load carrying body 10 is horizontally. In FIGS. 39a and 39b it is shown that the horizontal actuator 88 of the central walking element 80 was driven to extend the central walking element. The left portion of the ground touching portion 84 in FIG. 39a touches already the ground and the right portion is still free. The hinge 118 of the central walking element 80 is unlocked in that phase.

In FIGS. 40a and 40b, the vertical actuators 122, 126 lowered the ground touching portion 84 until the ground touching portion 84 touches the ground entirely. In that state, the hinge 118 is locked.

As it can be seen in FIGS. 41a and 41b, the transport device 1 stands stably solely on the central walking element 80 without tilting in one direction.

In FIGS. 42a and 42b, the transport device 1 again stands on the two side walking elements 20, 50 such that the central walking element 80 does not touch the ground anymore. As it can be seen, the ground touching portion 84 of the central walking element 80 remains in the position that was taken in order to adapt to the slope of the ground. Now, it is possible to unlock the hinge 118 in order to proceed with another adaptation step or the hinge 118 can be kept locked. That is especially desired when the adapted slope of the ground is continuous for a certain distance.

Figure 44:
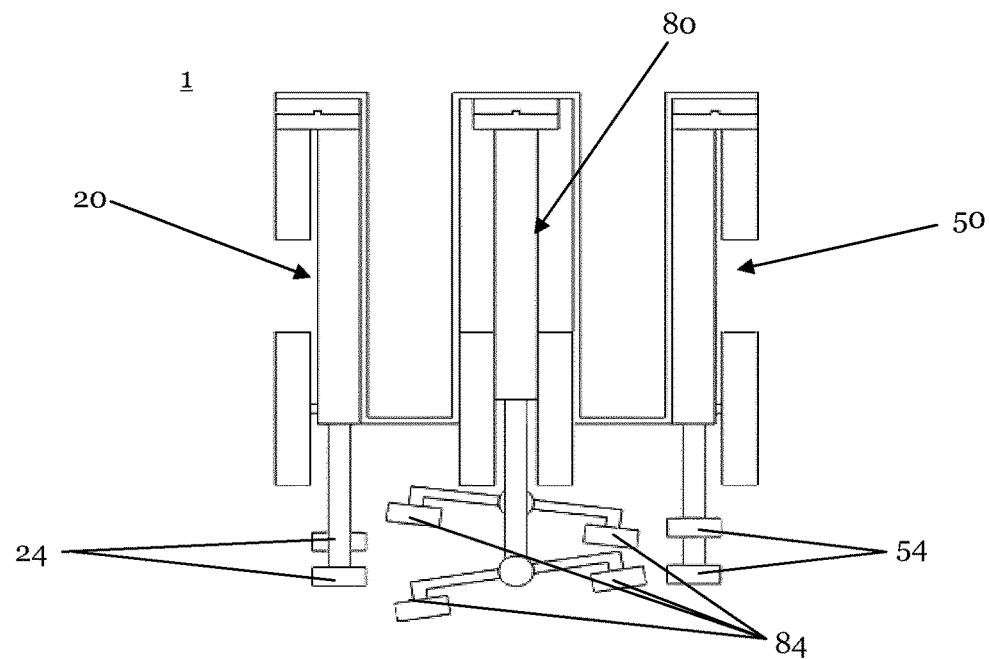
Figure 45:
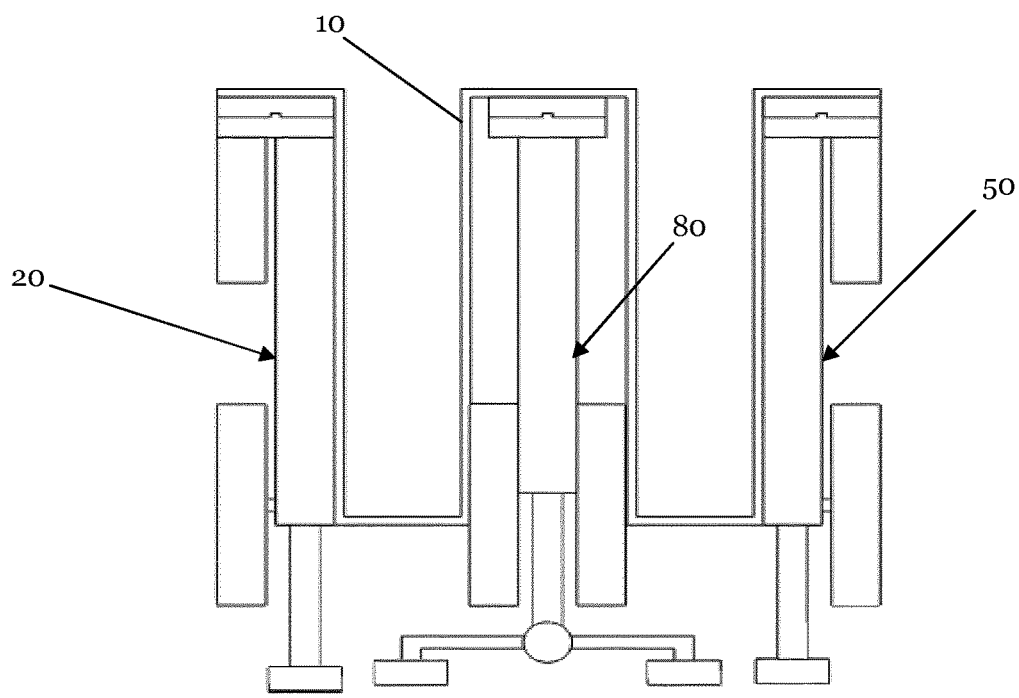

FIGS. 43-45 show a fourteenth embodiment of the transport device 1, having a combination of wheels 32, 62, 112 and separate ground touching portions 84. The wheels of the walking elements 20, 50, 80 are arranged in-between the vertical actuators. Another new feature of the fourteenth embodiment is the design of the ground touching portions 84 of the central walking element 80. As it can be seen in FIGS. 43 and 44, each of the two vertical actuators 122, 126 comprises a separate hinge 118 at its lower end. To this hinge, two ground touching portions 84 are fixed. These two ground touching portions are spaced apart from each other in the direction orthogonal to the back and forth movement direction. The same arrangement of ground touching portions is also given for the second vertical actuator of the central locking element 80. These two arrangements of ground touching portions can be locked independently from each other as described above. So it is possible to adapt the ground touching portion of the transport device 1 very flexibly to changing grounds.

FIG. 45 shows a schematic front view of the fourteenth embodiment, wherein the transport device 1 stands on all ground touching portions 24, 54, 84.

FIGS. 46-48c show a transport device for physically disabled people 2 that uses a transport device as described in the other embodiments. A physically disabled person can move around by the transport device 1 in a standing position and can walk over obstacles or drive around by wheels.

Therefore, the transport device 2 can be used during all activities of daily life and particularly for climbing stairs. In addition to the embodiments described before, the fifteenth embodiment comprises a pivot arm 210, a support structure 220, a torso support 23 and an active hinge 240 that form a human elevation and fixation structure. The person is fixed by a torso fixation to the pivot arm 210 of the transport device 2. In addition to that, the person is able to hold on tight and can erect himself from a seated to a standing position by means of a hand grip arrangement 220.

Figure 48A:
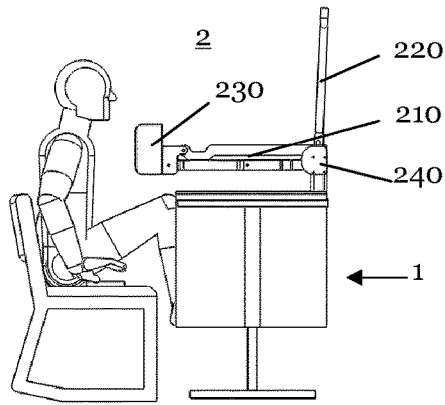
FIGS. 48a-48c show a method of assisting a physically disabled person to board the transport device.
Figure 48B:
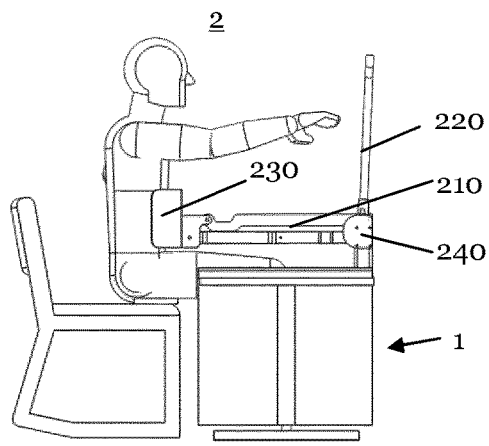
Figure 48C:
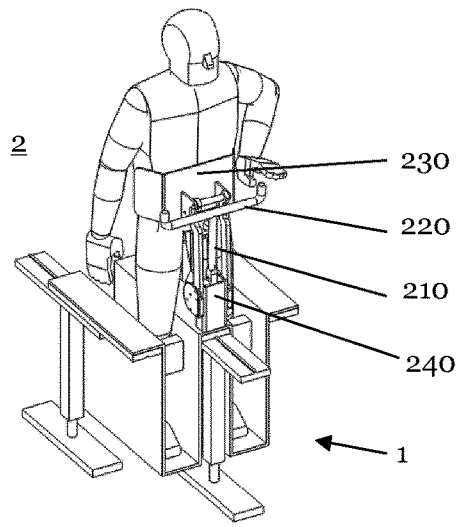

FIGS. 48a-48c show a preferred method of assisting a physically disabled person to board the transport device 2. As it can be seen in FIG. 48a the physically disabled person sits on any kind of a chair. The pivot arm 210 of the transport device 2 is hinged down in the direction vis-a-vis to the person. In this position the legs of the person are lifted such that the person can fix himself by a means of a belt to the torso fixation 230 to the pivot arm 210. In the next phase shown in FIG. 48b, the transport device for physically disabled people 2 drives the vertical actuators in a way that the transport device 2 comes as near to the ground as possible in order to make it more comfortable for the physically disabled person to erect himself. When the pivot arm 210 moved to an upright position the physically disabled person is erected to a standing position on the transport device 1. The person can hold on tight at the hand grip arrangement 220. At the hand grip arrangement any kind of control devices can be attached which allow the person to control the transport device, particularly the driving and walking movements.

FIG. 48c shows the way of walking of the transport device for physically disabled people 2. The method of walking corresponds to the method that has been described before in the description to FIGS. 4a-h, for example.

The hand grip arrangement 220 can be lowered to waist height of a seated person or below this height. This enables perfect sight for the person and the use of common tables or other furniture by a person being attached to the transport device.

FIGS. 49 to 53 show a sixteenth embodiment of the invention. Herein, the transport device 1 serves as a deck or bay for a separate indoor-device 300 which can be connected and disconnected from the remaining transport device 1.

Figure 49:
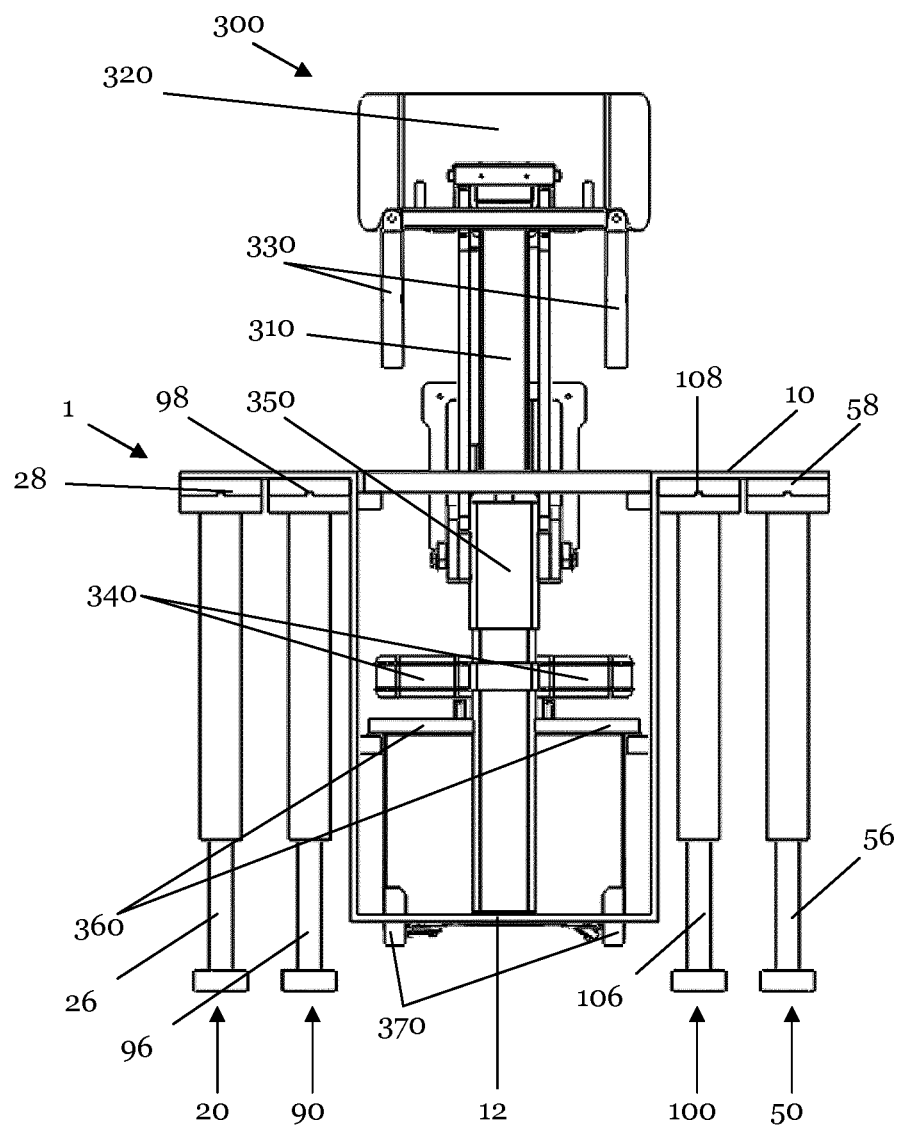
FIG. 49 shows a front view of the sixteenth embodiment of the invention, wherein the transport device comprises a deck for an indoor-device for physically disabled people.

FIG. 49 shows a front view of the transport device 1 and the separate indoor device 300 linked thereto. By means of the electrically driven indoor-device 300 physically disabled people can easily move around within a building in a standing or sitting position. The physically disabled person can "wear" the indoor-device 300 during its daily life and can also sit having the indoor device 300 attached to the body.

The separate indoor-device 300 is described in detail in the German (non-published) patent application DE 102011006359.5.1. The indoor-device 300 comprises a chassis with at least one motor for maneuvering the indoor-device 300, a pivot arm 310, which at its lower end is pivotably connected to the chassis and a pelvis support 320, which is connected to an upper end of the pivot arm 310. By means of such an indoor mobility device 300 a physically disabled person can sit with pelvis support 320 attached to its body, can move around with the indoor-device 300 in a standing or sitting position on the chassis, and can change on its own from seated to standing position. Preferably, all elements of the indoor-device 300 except the elements directly contacting the body of the person extending above pelvis height of the seated person can be lowered or maneuvered to or below this height.

The indoor-device 300 is designed in particular for the use within buildings so that physically disabled people require less external help in daily life and less devices like wheel chairs, lifting devices. In combination with the transport device 1 the indoor device 300 serves as a modular mobility device 1, 300 for physically disabled people that can be used indoors and outdoors and can either drive on wheels or walk on walking elements.

In order to ensure a stable standing position of physically disabled people, the indoor-device 300 further comprises in a preferred embodiment a tibia support 340 and hand grips 330. The indoor-device 300 comprises support bars 360, arranged in the front part of the indoor device 300 and in the rear part of the indoor-device 300. The support bars 360 provide a mechanical connection of the indoor-device 300 with the transport-device 1. By means of the support bars 360 and corresponding support plates 412 at the transport device 1 the indoor-device can be linked to the transport device 1 if desired. These support bars 360 additionally raise the stability of the indoor-device 300, when it is linked to the transport device 1. The support bars 360 transmit the weight forces of the indoor-device 300 and the physically disabled person to the transport device 1 and vice versa from the transport device 1 to the indoor-device 300 depending on the fact if the transport device 1 is walking on the walking elements 20, 50, 90, 100 or if the transport device is driving on the wheels 370 of the indoor device 300.

Additionally, these support bars 360 may optionally provide an energy- and/or data-connection between the transport device 1 and the indoor device 300. In this way, the transport device 1 may be controlled by the control devices of the indoor-device 300. Furthermore, the energy resources of the indoor-device 300 will be saved by using the energy sources (e.g. battery) of the transport device 1.

The transport device 1 comprises two side walking elements 20, 50, two central walking elements 90, 100 and a central lowered portion 12 of the load carrying body 10 between these two central walking elements 90, 100. The walking elements 20, 50, 90, 100 in the shown embodiment each comprise two ground touching portions 24, 54, 94, 104 and two vertical actuators 26, 56, 96, 106 to improve the stability when walking over obstacles.

An additional walking element (not shown) can be integrated into the central part of the indoor device 300. This walking element comprises a linear actuator for a vertical movement and a rotation actuator for a rotation around the vertical axis. The walking element can then be used to lift the transport device 1 and to rotate it on the spot. This is particularly usable for walking stairs that go around a corner or if other situations are given where little space is given for a rotation.

The central lowered portion 12 of the load carrying body 10 may consist of a solid plate, preferably a plate with recesses for wheels 370 and the additional walking element of the indoor-device 300 and most preferably of an open bottom. For the case, that the central lowered portion 12 consists of a plate with recesses for the wheels 370 and an additional walking element of the indoor-device 300, it is possible to further increase the stability of the mechanic link between the indoor-device 300 and the transport device 1, when the indoor device rests with large portions of the bottom side of the chassis on the lowered portion 12 of the load carrying body 10.

When the lowered portion 12 consists of a plate with recesses for wheels 370 of the indoor-device 300 or of an open bottom, it is possible to operate the combination of indoor-device 300 and transport device 1 in a drive-mode. In this "drive-mode" the walking elements 20, 50, 90, 100 of the transport device 1 are retracted and the combination of indoor-device 300 and transport device 1 rests only on the wheels 370 of the indoor-device 300. Therefore, the linkage between the transport device and the indoor-device 300 by the support bars 360 has to be designed lockable. Thus the indoor-device 300 is able to carry the transport device 1 when the walking elements 20, 50, 90, 100 are retracted and do not touch the ground anymore. Thus, it is possible, to move around in the faster drive-mode, even when the indoor-device 300 is linked to the transport device 1. A decoupling of transport device 1 and indoor-device 300 is not necessary for using the drive-mode.

In a "walk-mode" the walking elements 20, 50, 90, 100 of the transport device 1 are extended and the combination of indoor-device 300 and transport device 1 rests only on the ground touching portions 24, 54, 94, 104 of the transport device 1.

In order to connect the indoor-device 300 to the transport device 1, the physically disabled person that is fixed to the indoor-device 300 drives "into" the transport device 1. In a preferred embodiment, it is possible to drive forwards and/or backwards into the transport device 1 on the lowered portion 12 of the load carrying body 10. To this end the transport device 1 is in a lowered position, so that the indoor-device 300 may drive over an immobilizer bar 418, which preferably touches the ground. In a preferred embodiment, the immobilizer bar 418 is attached to the lower front end of the lowered portion 12. When the indoor-device 300 rolled over the immobilizer bar 418, the immobilizer bar 418 ensures, that the indoor-device 300 stays on its position and is restrained to roll out of the lowered portion 12 inadvertently.

In the next step, the physically disabled person lifts the transport device 1 via control means of the transport device 1 until the support bars 360 are connected to the support plates 412 of the transport device 1. Preferably, these connections can be locked, in order to enable the indoor-device 300 to carry the transport device 1, when the combination of indoor-device 300 and transport device 1 rests only on the wheels 370 of the indoor-device 1 in the drive-mode.

In the next step the physically disabled person may attach a fixation crossbar 414 to the support plates 416 in order to increase the safety. In a preferred embodiment, the support plates 416 are connected to the control devices of the transport device, so that it is only possible to drive/walk around with the combination of indoor-device 300 and transport device 1 when the fixation crossbar is correctly attached thereto.

In the next step, the physically disabled person is able to walk or drive around as desired. As a part of a combined device 300, 1, the transport device 1 is larger and made for the outdoor use. The user can "discard" the transport device 1 when the deck is too cumbersome or when the outdoor movement ability is not required. I.e.: the person walks with the combined device to his office from home, discards the deck at the entrance of the office and then uses the indoor-device 300 within the office building.

Preferably, the transport device 1 is designed in different widths, so that it is possible to fit the transport device in view of the width of the hips of the physically disabled people.

Figure 50A:
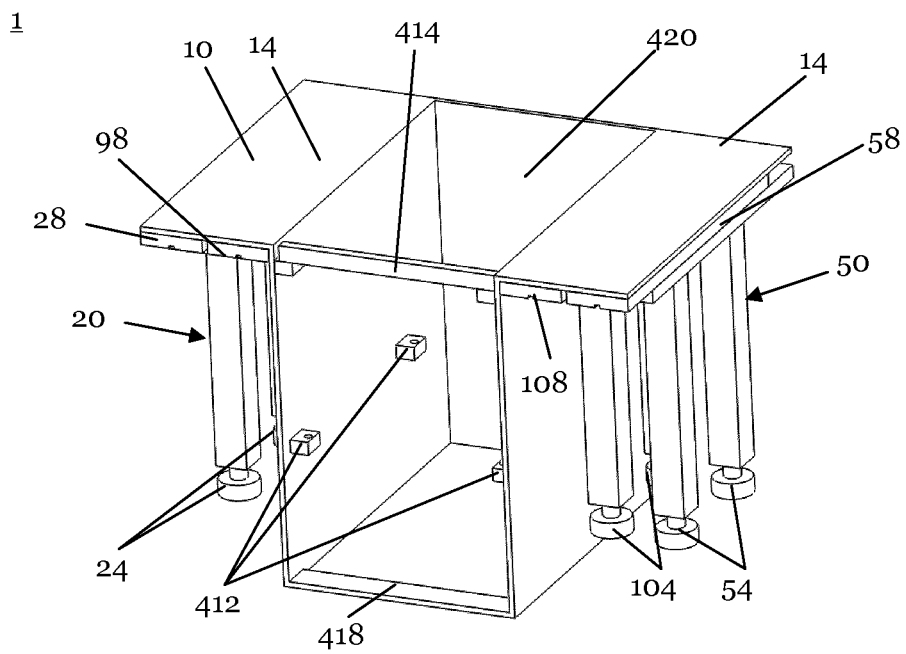
FIGS. 50a-50b show perspective views of the transport device without the indoor-device.
Figure 50B:
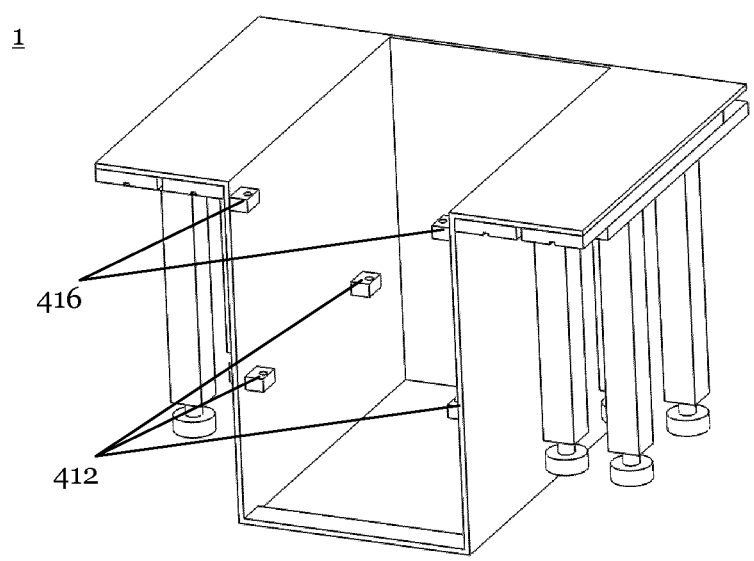

FIGS. 50*a* to 50*b* show the transport device 1 of the sixteenth embodiment. The support plates 412 work as counterparts to the support bars 360 of the indoor-device 300. These support plates 412 may optionally comprise centering units in order to facilitate the coupling of indoor-device 300 and transport device 1. Additionally, these support plates 360 may optionally be used to provide an energy- and/or data-connection between the transport device 1 and the indoor device 300. In this way, the transport device 1 may be controlled by the control devices of the indoor-device 300 and thus the energy resources of the indoor-device 300 will be saved.

The immobilizer bar 418, the fixation crossbar 414 and the support bars 360 increase the stability and provide an increased security of the person using the transport device 1. All means ensure on their own and preferably in combination that the transport device 1 and the indoor device 300 cannot move with respect to each other, while they are linked.

A rear panel 420 of the transport device 1 increases the stability of the transport device 1. In addition, this rear panel 420 serves as a stop face in order to ensure the correct position of the indoor-device 300 in back-and-forth-direction during the linking of indoor-device 300 and transport device 1.

FIG. 50*b* shows the support plates 416 of the fixation crossbar 414 in detail. These plates 414 may also comprise centering units, lock means, safety means or the like. It is for instance possible, to connect the safety means of the support plates 416 with the control devices of the transport unit 1. So, it is possible to ensure, that the fixation crossbar 414 is correctly locked before it is possible to start operation of the transport device 1.

FIGS. 51*a* to 51*d* show the transport device 1 with linked indoor-device in drive mode in three different perspectives.

Figure 52A:
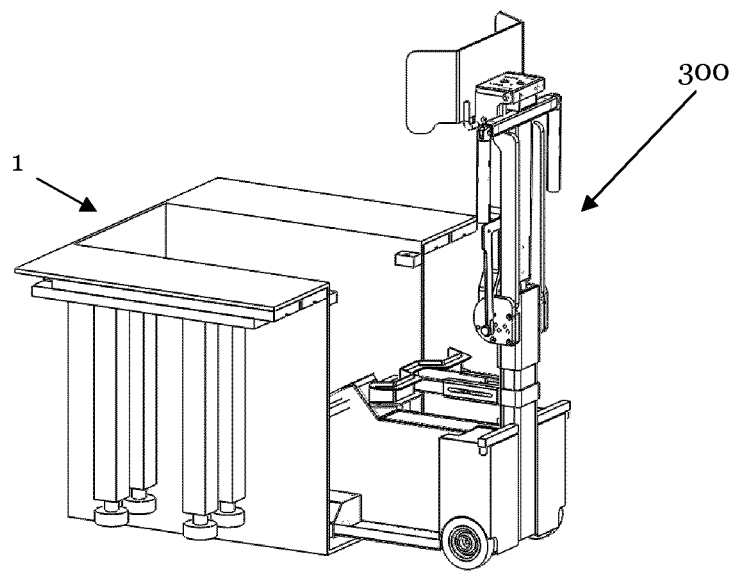
FIGS. 52a and 52b show different options to drive the indoor-device on the lowered portion of the load carrying body.
Figure 52B:
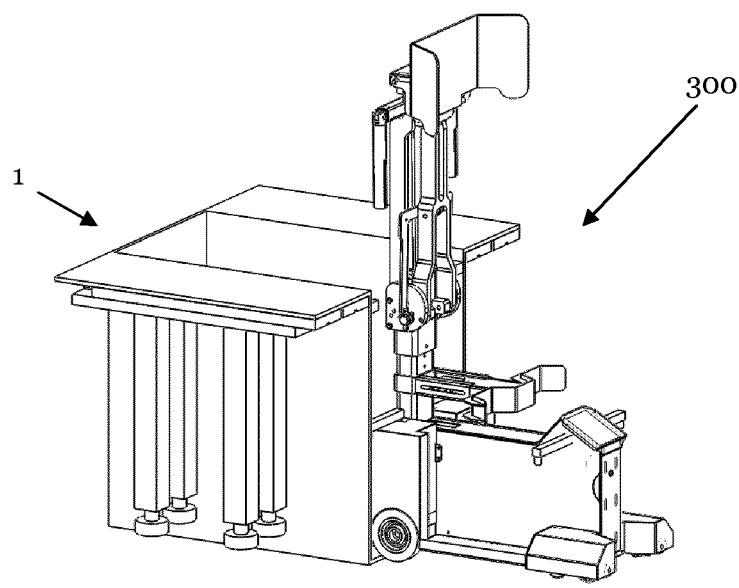

As it can be seen from FIGS. 52*a* and 52*b*, it is possible to drive with the indoor device onto the central lowered portion 12 of the load carrying body 10 forwards and backwards. It does not matter, in which direction (backwards or forwards) the indoor-device 300 is linked to the transport device 1.

Figure 53A:
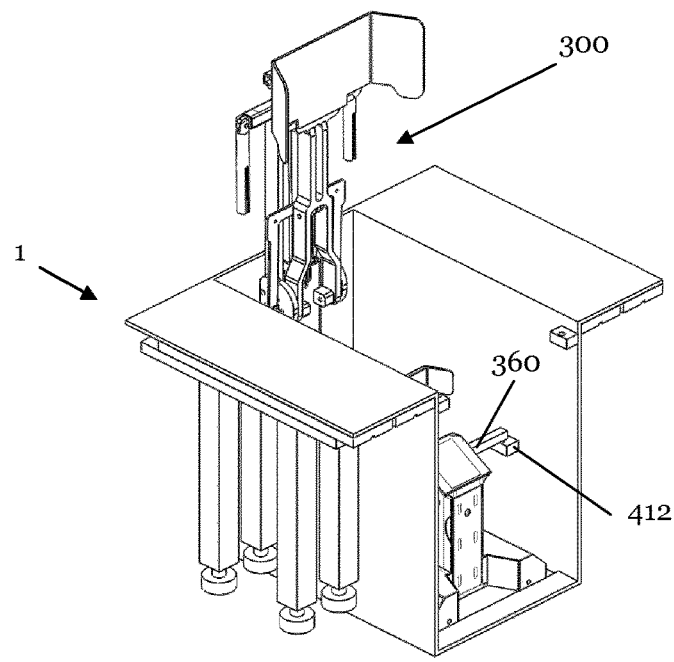
FIGS. 53a and 53b show different perspective views of the indoor-device that was driven forwards on the lowered portion of the load carrying body.
Figure 53B:
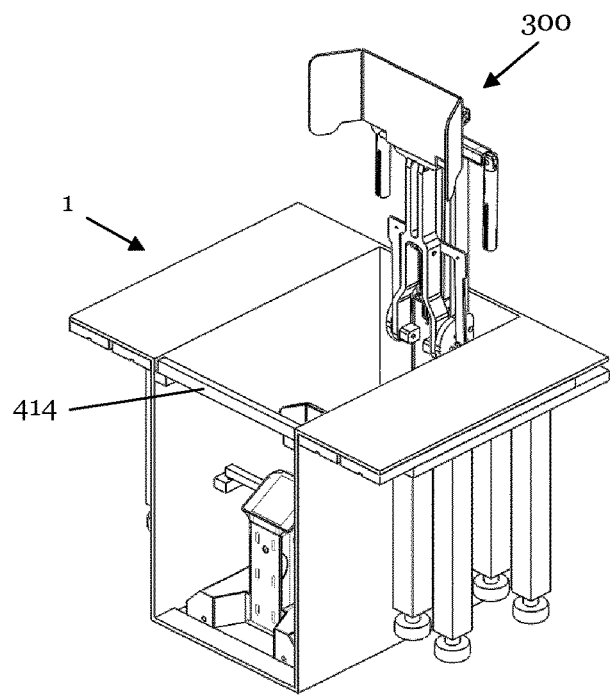

FIGS. 53*a* and 53*b* show the indoor-device 300 that was driven forwards on the central lowered portion 12 of the load carrying body 10. FIG. 53*a* shows the state when the fixation crossbar 414 is not attached. FIG. 53*b* shows the state when the fixation crossbar 414 is in position and the transport device 1 is ready for outdoor use.

In view of the above a novel transport device 1 is presented that enables to walk over obstacles—for example stairs—in a particular balanced and safe manner. Such a transport devices can additionally comprise wheels to allow both a fast drive on even ground by means of the wheels and a walk over obstacles by means of the walking elements. These features of a transport device 1 are particularly beneficial in an application for improving the mobility of physically disabled people. By using such a transport device their daily mobility needs indoors and outdoors are highly supported.

The invention claimed is:

1. Transport device, comprising
   a. a load carrying body;
   b. at least one central walking element, a first side walking element and a second side walking element, wherein the at least one central walking element is arranged in lateral direction in-between the two side walking elements; and
   c. each of the walking elements are arranged at the load carrying body in a manner to be capable of moving up and down with respect to the load carrying body,
   d. wherein the side walking elements can move up and down independently from the at least one central walking element by vertical actuators; and
   e. each of the walking elements are arranged at the load carrying body in a manner to be capable of moving back and forth in horizontal direction with respect to the load carrying body, wherein the two side walking elements can move back and forth independently from the at least one central walking element by horizontal actuators.

2. Transport device according to claim 1, wherein each of the walking elements can move up and down and back and forth independently from each other.

3. Transport device according to claim 1, wherein
   a. the side walking elements comprise ground touching portions with an extension in the back and forth horizontal direction, such that the transport device is capable of standing stably alone on the side walking elements; and
   b. the at least one central walking element comprises a ground touching portion in the back and forth horizontal direction and in transversal direction such that the transport device is capable of standing stably alone on the at least one central walking element.

4. Transport device according to claim 1, wherein the at least one central walking element comprises two central walking elements, wherein the two central walking elements are spaced apart from each other and are arranged adjacent to the two side walking elements.

5. Transport device according to claim 1, wherein the load carrying body comprises raised actuator support portions and one or more lowered portions.

6. Transport device according to claim 1, wherein each of the at least one central walking element and each side walking element comprises more than one vertical actuator per walking element, wherein the more than one vertical actuators of each walking element are arranged one after the other in direction of the back and forth movement.

7. Transport device according to claim 6, wherein each of the more than one vertical actuators per walking element comprise either one common ground touching portion per walking element to which the more than one vertical actuators are pivotably fixed; or each of the more than one vertical actuator per walking element comprise a separate ground touching portion.

8. Transport device according to claim 1, wherein each of the at least one central walking element comprises a lockable hinge between a vertical actuator and a ground touching portion having a rolling axis in the direction of the back and forth movement.

* * * * *